United States Patent

Sasaki et al.

Patent Number: 6,116,774
Date of Patent: Sep. 12, 2000

[54] ADHESIVE-FIXED BODY ELECTRONIC APPARATUS AND WATCH

[75] Inventors: Shigemi Sasaki, Chino; Tsutomu Saito, Hachioji, both of Japan

[73] Assignee: Seiko Epson Corporation, Tokyo, Japan

[21] Appl. No.: 09/004,262

[22] Filed: Jan. 8, 1998

[51] Int. Cl.[7] .......................... G04B 37/00; B32B 15/04; C08J 7/04; C08G 18/28

[52] U.S. Cl. .......................... 368/280; 368/249; 156/334; 428/355 AC; 522/42; 522/90; 522/96; 525/301; 525/455; 528/44; 528/59; 528/75

[58] Field of Search .................................. 368/276, 280; 156/334; 428/355 AC; 522/6–8, 34, 36, 44, 46, 79, 90, 96, 103; 525/920, 922, 301, 454, 455; 528/44, 59, 75

[56] References Cited

U.S. PATENT DOCUMENTS

| | | |
|---|---|---|
| 4,309,526 | 1/1982 | Baccei . |
| 4,763,312 | 8/1988 | Tokunaga et al. . |

FOREIGN PATENT DOCUMENTS

| | | |
|---|---|---|
| 0 301 733 | 2/1989 | European Pat. Off. . |
| 0 383 015 | 8/1990 | European Pat. Off. . |
| 40 25 776 | 2/1992 | Germany . |
| 2 200 127 | 7/1988 | United Kingdom . |
| 9 321 248 | 10/1993 | WIPO . |

*Primary Examiner*—Vit Miska
*Attorney, Agent, or Firm*—Stroock & Stroock & Lavan LLP

[57] ABSTRACT

A bonded body uses an adhesive having high water resistance to realize an adhesive-fixed structure having excellent waterproof properties and exhibiting relatively low changes in properties of the adhesive layer over time. The adhesive-fixed body of the present invention can be obtained by bonding and fixing a body and a glass cover as exterior pairs of a watch with an adhesive layer. The adhesive of the invention can be a curable adhesive containing 100 parts by weight of prepolymer resin having polytetramethylene oxide as a main chain and methacryl groups or acryl groups at both ends of the main chain or in side chains, 50 to 300 parts by weight of at least one selected from acrylic monomers or methacrylic monomers comprising isobornyl acrylate, isobornyl methacrylate or a mixture thereof, and a coupling agent.

58 Claims, 12 Drawing Sheets

ADHESIVE-FIXED BODY ELECTRONIC APPARATUS AND WATCH

BACKGROUND OF THE INVENTION

The invention relates generally to an adhesive-fixed body which can contain an electronic apparatus, such as a watch and more particularly to a body or watch having high waterproof, moisture proof, water resistance, moisture resistance, durability and/or shock resistance properties.

Conventional waterproof watches generally have a structure in which a synthetic resin gasket or packing is press-fit to the engagement portion between a watch case body and a transparent cover glass (watch crystal) to fix both members and ensure a waterproof coupling. However, this method increases the thickness of the gasket needed, to some extent, in order to obtain sufficient sealing performance, and requires the watch case body and the transparent glass (crystal) which supports the gasket, to have predetermined rigidity. Therefore, the dimensions of the watch in the thickness and plane directions are inevitably increased. Also, it is necessary to prepare gaskets of varying shapes corresponding to each watch type, which complicates management of parts and the assembly and repair process.

An assembly technique has been proposed in which parts of a watch are bonded and fixed directly with an adhesive without using a gasket. Japanese Examined Patent Publication No. 7-98674 discloses a structure in which a watch case body and transparent glass are bonded and fixed with a highly waterproof and durable adhesive. However, a conventional watch having the structure in which both members are bonded and fixed with adhesive has an inadequacy, such as being insufficiently waterproof, when the water pressure increases to 5 atm or more. Also, such a structure can have durability problems due to dissolution of the adhesive layer from long term water exposure. The adhesive disclosed in the above Japanese Patent Publication No. 7-98674 has less problems with deterioration after exposure to water, as compared with previous adhesives, but undesireable deterioration can occur when the adhesive is immersed in hot water for a long period of time. Therefore, the adhesive cannot be used for many applications in which there are opportunities for long term contact with water, such as sea bathing, bathing, fishing, kitchen work, etc.

Bodies fixed with many conventional ultraviolet curable adhesives and other epoxy adhesives can have a problem in that curing proceeds and brittleness increases with time. This can deteriorate shock resistance. If the shock resistance deteriorates due to an increase in brittleness of the adhesive layer, such as, when a watch is used in an outdoor sport, the adhesive layer can become cracked when shock is applied to the watch. This can eliminate the waterproof effect, and cause peeling or separation between adhered parts. Therefore, in the case of a waterproof watch, deterioration in shock resistance can be a fatal defect.

Accordingly, is it desirable to provide an adhesive-fixed body, such as a watch, which overcomes inadequacies of the prior art.

SUMMARY OF THE INVENTION

Generally speaking, in accordance with the invention, an adhesive-fixed body which is constructed by bonding and fixing first and second members with an adhesive, having high resistance to water and suitably low brittleness. The adhesive is preferably a curable adhesive which can include prepolymer having polytetramethylene oxide as a main chain; prepolymer having methacryl groups or ac-yl groups at either or both ends of the main chain or on side chains; acrylic monomers or methacrylic monomers; isobornyl acrylate, isobornyl methacrylate; and/or silane coupling agents. A preferred composition includes as components a) 100 parts by weight of prepolymer having polytetramethylene oxide as a main chain, and methacryl groups or acryl groups at one or both ends of the main chain or in side chains, b) 50 to 300 parts by weight of acrylic monomers or methacrylic monomers including isobornyl acrylate, isobornyl methacrylate, or mixtures thereof, and c) a coupling agent such as a silane coupling agent.

A preferred acrylic monomer or methacrylic monomer composition of the adhesive preferably contains 28 to 80% by weight of isobornyl acrylate, isobornyl methacrylate or a mixture thereof. This permits realization of the adhesive-fixed body comprising the adhesive layer having excellent heat resistance, adhesion, water resistance and flexibility. A preferred adhesive preferably contains 0.5 to 20 parts by weight of silane coupling agent. This improves adhesion to glass and metals in particular. A preferred adhesive preferably contains 1 to 20 parts by weight of polymerization initiator. This permits efficient curing of the adhesive. The adhesive is preferably a photo-curable adhesive. This permits easy bonding when at least one of the first and second members is a member comprising a light transmitting member. The uncured adhesive preferably has viscosity of 450 to 6500 cps at 25° C. This causes excellent workability of bonding, and improves uniformity of the adhesive layer. An adhesive layer of the adhesive preferably has an average thickness of 2 to 600 Fm. This can ensure good adhesion and excellent workability of bonding.

A fixed body employing such an adhesive layer has excellent water resistance and can prevent increase in hardness after adhesion and low deterioration in elasticity with time compared to adhesives of the relevant prior art, and thus permits realization of an adhesive-fixed structure having high waterproof and/or moisture proofing properties and excellent durability.

Accordingly, it is an object of the invention to provide an adhesive fixed body which overcome problems existing in the prior art.

Another object of the invention is to provide an improved adhesive-bonded watch structure.

A further object of the invention is to provide an adhesive bonded watch structure having improved durability.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
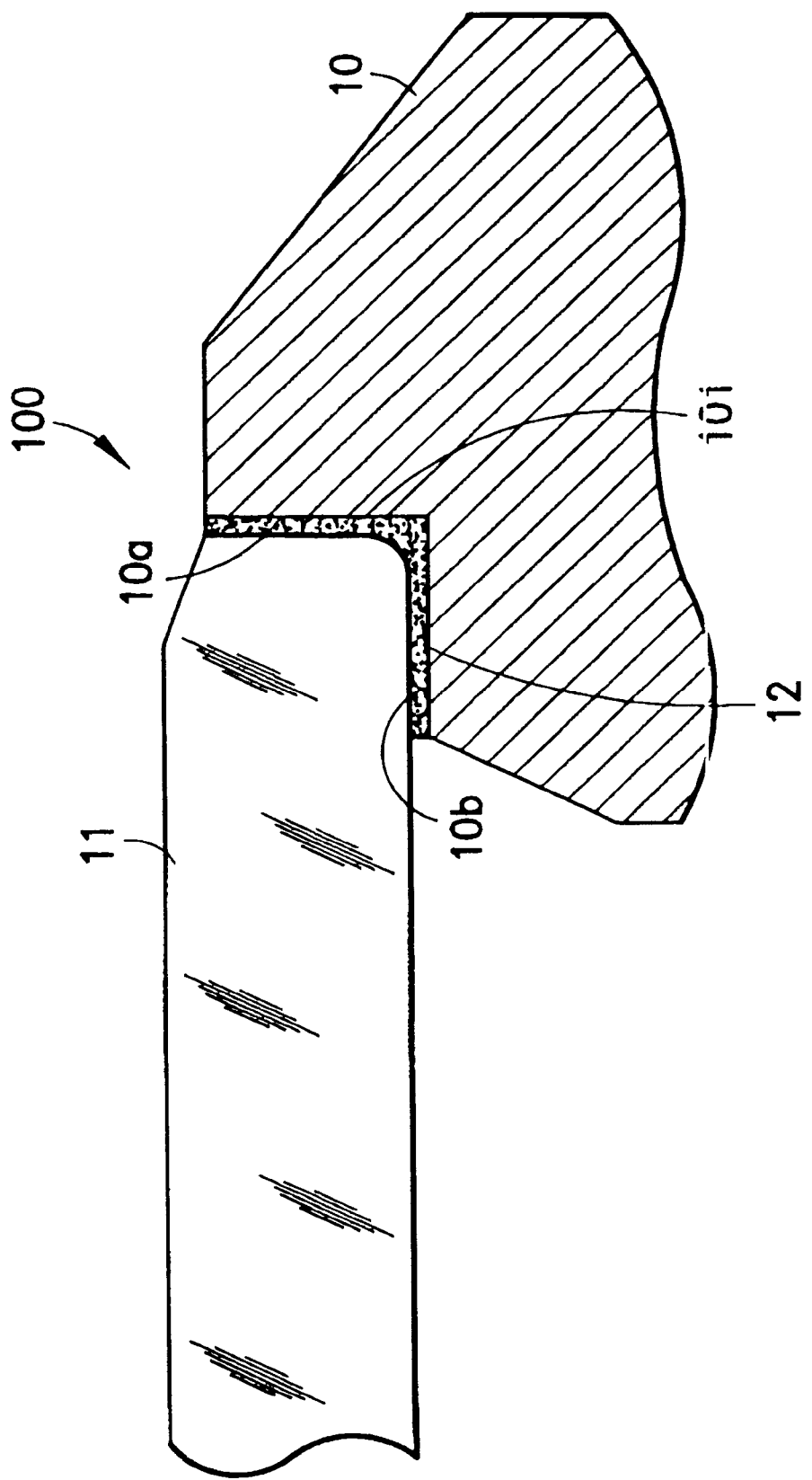
FIG. 1 is a partial sectional view showing the construction of a first embodiment of the present invention.

An adhesive bonded body in accordance with the invention exhibits high durability to exposure to water and/or UV and high shock resistance in part, by maintaining relativity low rigidity and resistance to cracking. It has been determined that the adhesions described herein are particularly well united for bonding watch parts, such as bonding the watch crystal to the watch case or bonding layers of a watch crystal laminate to each other. The result is a structure having waterproof, durable and shock resistant properties comparable or superior to watches having resin gaskets and can lead to structures having improved thinness and ease of manufacturer and repair.

An adhesive-fixed body in accordance with the invention is constructed by bonding and fixing first and second members of the body with an adhesive. The adhesive is preferably a curable adhesive which can include prepolymer having polytetramethylene oxide as a main chain. The adhesive can also include prepolymer having methacryl groups or acryl groups at either or both ends of the main chain or on side chains; acrylic monomers or methacrylic monomers; isobornyl acrylate, isobornyl methacrylate; and/or coupling agents such as silane coupling agents.

A preferred composition includes as components a) 100 parts by weight of prepolymer having polytetramethylene oxide as a main chain, and methacryl groups or acryl groups at either or both ends of the main chain or in side chains, b) 50 to 300 parts by weight of acrylic monomer or methacrylic monomer composition including isobornyl acrylate, isobornyl methacrylate, or mixtures thereof. A coupling agent such as a silane coupling agent is also preferred.

This construction permits formation of an adhesive layer having excellent water resistance and resistance to an increase in hardness over time, after adhesion and low deterioration in elasticity with time compared to adhesives of the relevant prior art, and thus permits realization of an adhesive-fixed structure having high waterproof and/or moisture proofing properties and excellent durability and shock resistance.

A preferred acrylic monomer or methacrylic monomer of the adhesive preferably contains 28 to 80% by weight of isobornyl acrylate, isobornyl methacrylate or a mixture thereof This permits realization of the adhesive-fixed body comprising the adhesive layer having excellent heat resistance, adhesion, water resistance and flexibility.

A preferred adhesive preferably contains 0.5 to 20 parts by weight of the silane coupling agent. This improves adhesion to glass and metals in particular.

A preferred adhesive preferably contains 1 to 20 parts by weight of polymerization initiator. This permits efficient curing of the adhesive.

The adhesive is preferably a photo-curable adhesive. This permits easy bonding when at least one of the first and second members is a member comprising a light transmitting member. Otherwise, other curing methods such as a heat curing method are desireable.

The uncured adhesive preferably has a viscosity of 450 to 6500 cps at 25° C. This causes excellent workability of bonding, and improves uniformity of the adhesive layer. If viscosity is too low, it can cause leakage problems. If too high, it can be difficult to apply thin ribbon.

An adhesive layer of the adhesive preferably has an average thickness of 2 to 600 $\mu$m. This can ensure good adhesion and excellent workability of bonding.

In one embodiment of the invention, at least one of the first and second members is a glass member. The first and second members can be the same material or different glass materials. For example, the first and second members can be glass materials having different compositions or physical properties, such a different hardness. Because the adhesive is particularly suitable for bonding glass and maintains suitable elasticity, it will not cause peeling problems if the two members have different thermal expansion properties.

A display layer can be inserted and fixed between the first and second members. This permits visual observation of the display layer through glass, and prevents undesirable movement of the display layer.

The second member can have higher hardness than the first member and the first member can have a recess formed therein. This permits easy formation of the recess in the soft member while securing hardness required on the second member side.

The above-described bonded structure of the adhesive-fixed body can be used as a bonded structure between components of various electronic apparatus. Examples of electronic apparatus include an electronic watch, a portable telephone, a pocket bell, an electronic calculator, a personal computer, a word processor, a printer, a copying machine, an electronic toy, various measuring apparatus, a liquid crystal display device (LCD), etc. The bonded structure of the above adhesive-fixed body is particularly suited for use as a bonded structure between exterior parts of a watch. For example, this bonded structure can be applied to bonding between a watch case and cover glass, and bonding of at least two types of glass to form a cover glass, for example, bonding between sapphire glass and inorganic glass. The adhesive-fixed body of the present invention can be applied to bonding not only in the electronic apparatus and a watch but also in various articles having bonded parts, for example, toys (especially, toys used in water), water glasses, window glasses, etc.

Embodiments and examples of the present invention are described below with reference to the attached drawings. These embodiments and examples are provided for purposes of illustration only and are not intended to be construed in a limiting sense.

FIG. 1 is a partial sectional view showing the structure of a bonded part of a wrist watch 00 in accordance with a first embodiment of the present invention. Watch 100 includes a body 10 which constitutes the case body of wrist watch 100, and a cover glass 11. Case body 10 comprises a watch machine body on which a nameplate and needles are provided, external operational members such as a winding crown, a button, and the like inserted into the body, and a back cover to form a watch (all not shown). On the inner side of the upper portion of body 10 is placed a ring-shaped support step 101 such that the peripheral surface and a portion of the bottom of the cover glass 11 are in contact with a pair of support faces 10a and 10b of support step 101.

Cover glass 11 can be formed of inorganic glass including, but not limited to, silicate glass, soda glass, sapphire glass, or spinel glass, a synthetic resin or another transparent material.

Body 10 can be formed of various metals including, but not limited to, titanium, stainless steel, copper alloys such as brass, German silver or aluminum, surface-treated by plating with noble metals such as gold, silver and platinum; hard metals including, but not limited to carbides, nitrides, oxides, borides, and the like; various ceramics or various hard resin materials.

Between support faces 10a and 10b and cover glass 11 is interposed an adhesive layer 12 obtained by curing an adhesive comprising a curable resin, preferably a photo-curable resin which is cured by irradiation of light such as ultraviolet rays, to bond both members.

A preferred example of such a curable adhesive, referred to hereinafter as "the adhesive" or the "above adhesive" comprises:
   a) 100 parts by weight of prepolymer resin, referred to hereinafter as "component a," having tetramethylene oxide as a main chain, and methacryl groups or acryl groups or substituents at one or both ends of the main side or in one or more side chains;
   b) 50 to 300 parts by weight of at least one polymerizable acrylic monomer and/or methacrylic monomer composition, referred to hereinafter as "component b" selected from acrylic monomer and methacrylic monomer compositions containing isobornyl acrylate, isobornyl methacrylate or a mixture thereof and
   c) a silane coupling agent, referred to hereinafter as "component c".

The curable adhesive further comprises:
   d) a polymerization initiator, referred to hereinafter as "component d".

Component a

Component a is mainly used for obtaining excellent adhesive force and improving water resistance, curability, shock resistance and low-temperature properties of the adhesive.

Polytetramethylene oxide is represented by the following chemical formula:

$$-O-(CH_2-CH_2-CH_2-CH_2-O)_n-$$

Methacryl groups or acryl groups may be introduced into both ends or the side chains of tetramethylene oxide, for example, by bonding (meth)acrylic acid by an esterification reaction or by bonding (meth)acrylic monomer having one hydroxyl group to diisocyanate.

Although polyethylene oxide, polypropylene oxide, polybutadiene, and the like can be considered as the main chain units, these can be unsuitable for use in the various applications of the present invention. A main chain comprising polyethylene oxide, can for example, lead to deterioration in water resistance. The surface of polypropylene oxide is hardly cured by curing with ultraviolet rays, and it has lower water resistance than polytetraethylene oxide. When the main chain comprises polybutadiene, water resistance is improved, but surface curability and low-temperature properties can deteriorate, and curing proceeds with time because of the double bonds in its chemical structure. Polybutadiene thus can tend to cause insufficient long-term reliability.

In contrast to these polymers, polytetramethylene oxide has four methylyene groups and has excellent water resistance, surface curability and low-temperature properties.

Examples of component a include, but are not limited to, polytetramethylene diacrylate, polytetramethylene urethane diacrylate, and the like.

Component b

Component b is mainly used for appropriately adjusting the viscosity of component a. Examples of acrylic monomers or methacrylic monomers included in component b include 2-hydroxyethyl (meth)acrylate, 2-hydroxypropyl (meth)acrylate, tetrahydrofurfuyl (meth)acrylate, phenoxy-ethyl (meth)acrylate, dicyclopentenyl (meth)acrylate, and the like. These compounds can be used singly or in a mixture of at least two compounds.

The content of component b is preferably 50 to 300 parts by weight relative to 100 parts by weight of component a. With a content of less than 50 parts by weight, the viscosity of the uncured adhesive is increased, and the workability of bonding deteriorates. With a content of over 300 parts by weight, the viscosity of the uncured adhesive is decreased, and the adhesive easily flows during coating, thereby deteriorating workability. In addition, the flexibility or elasticity of the adhesive after curing tends to deteriorate, thereby deteriorating shock resistance. To achieve a suitable viscosity of the uncured adhesive, flexibility after curing and shock resistance, the more preferable content of component b is 70 to 250 parts by weight relative to 100 parts component a.

Component b preferably contains 28 to 80% by weight of isobornyl acrylate or isobornyl methacrylate singly or in a mixture thereof. If the content of isobornyl acrylate, isobornyl methacrylate or a mixture thereof is less than 28% by weight, heat resistance, adhesion and water resistance deteriorate, as compared with a content in the above range. With a content of over 80% by weight, flexibility tends to be lost, and shock resistance deteriorates, In consideration of flexibility and shock resistance, the content of isobornyl acrylate, isobornyl methacrylate or a mixture thereof is more preferably 30 to 65% by weight.

Component c

Component c is used for improving adhesive force to glass and metals in particular, and for improving reliability for long-term water resistance. Examples of component c include, but are not limited to γ-methacryloxypropyl trimethoxysilane, γ-methacryloxypropyl trimethoxysilane, γ-glycidoxypropyl trimethoxysilane, γ-vinyltrimethoxysilane, N-β N-vinylbenzylaminoethyl-γ-aminopropyltrimethoxysilane hydrochloride, and the like.

Although the content of component c is not limited, the content is preferably 0.5 to 20 parts by weight, more preferably 1 to 15 parts by weight, based on 100 parts by weight of component a. With a content of less than 0.5 parts by weight, adhesive force to glass deteriorates and long-term reliability for water cannot be improved. With a content of over 20 parts by weight, the initial adhesive force can deteriorate.

Component d

Component d is used for facilitating polymerization curing by irradiation of light, for example, ultraviolet rays. Examples of component d include, but are not limited to, diethoxyacetophenone, 2-hydroxy-2-methyl-1-phenylpropane-1-one, benzoin, benzoin (methyl)ethyl ether, benzophenone, and the like.

Although the content of component d is not limited, the content is preferably 1 to 20 parts by weight, more preferably 2 to 15 parts by weight, based on 100 parts by weight of component a. With a content of less than 1 part by weight, the curing rate is low, and thus practicability is low. With a content of over 20 parts by weight, adhesive force can deteriorate.

In addition to components a, b, c and d, other desired additives for various purposes can be added to the adhesive. An example of such additives is a radical polymerization inhibitor for improving stability of the adhesive. Examples of the radical polymerization inhibitors, include, but are not limited to, hydroquinone, hydroquinone methyl ether, t-butylcatechol, benzoquinone.

In order to cure a portion which cannot be irradiated with light, for example, an organic peroxide and a redox catalyst may be added as an anaerobic curing agent. The addition of these compounds can impart anaerobic curing properties to the adhesive. This method enables bonding between opaque members.

Examples of the organic peroxides include diacyl peroxide, ketone peroxide, hydroperoxide, dialkyl peroxide, peroxyesters, and the like. Examples of the redox catalysts include tertiary amines, thioureas, metallic organic salts, reducing organic compounds, and the like.

Particularly, when the adhesive is used for bonding glass or other transparent members, the adhesive is preferably substantially transparent and of suitable refractive index.

Although the viscosity of the uncured adhesive is not limited, the viscosity is preferably about 450 to 6500 cps (25° C.), more preferably about 800 to 3500 cps (25° C.). With excessively high viscosity, the workability of the work of coating the adhesive is poor, and the adhesive cannot be uniformly coated in some cases. With excessively low viscosity, the adhesive easily flows during coating, and thus the workability is poor. In addition, the flexibility or elasticity of the adhesive after curing deteriorates, and thus shock resistance deteriorates according to the composition of the adhesive used.

The thickness of adhesive layer 12 is not limited and appropriately set according to the forms and conditions between bonded members. However, the thickness of adhesive layer 12 is preferably 2 to 600 μm, more preferably 4 to 250 μm, for many applications. If adhesive layer 12 is excessively thin, the buffer effect is low when adhesive layer 12 is subjected to shock, and shock resistance thus deteriorates in some cases. If adhesive layer 12 is excessively thick, the excess adhesive is projected during bonding, thereby deteriorating the workability. Adhesive layer 12 may have a portion having a thickness which is out of the above range.

The above-described conditions for the composition, characteristics, thickness, etc. of the adhesive are not limited to the adhesive-fixed body shown in FIG. 1, and apply to embodiments and examples described below, and others of the present invention.

Figure 2:
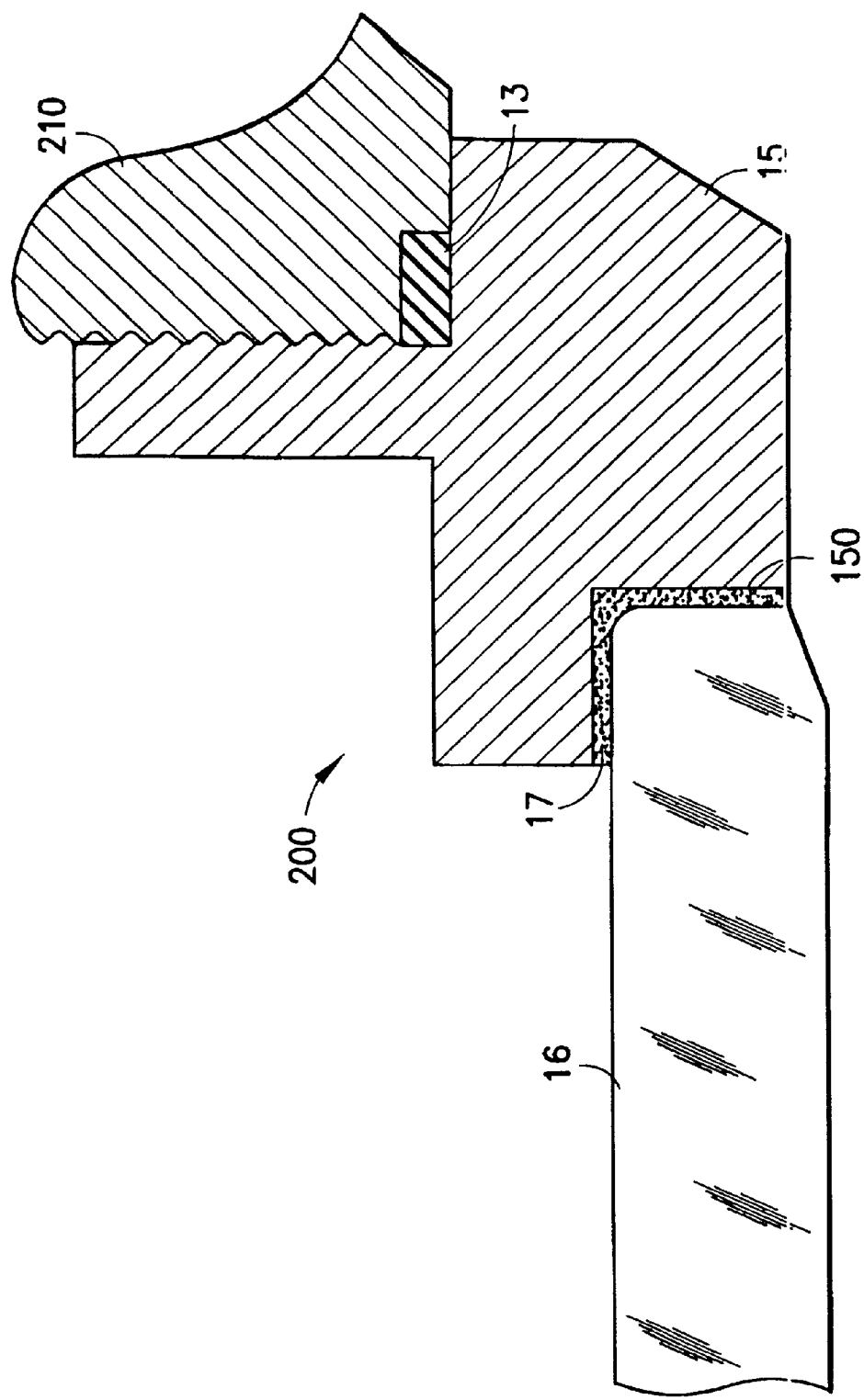
FIG. 2 is a partial sectional view showing the construction of a second embodiment of the present invention.

FIG. 2 shows a watch in accordance with a second embodiment of the invention in which the back side of a wrist watch 200 has a skeleton structure for improving decorativeness. In watch 200, a cover glass 16 is bonded and fixed to a back cover frame 15 which is screwed to a body 10 so that the inside of the watch can be seen.

In this case, as in the first embodiment, back cover frame 15 and cover glass 16 are bonded and fixed through an adhesive layer 17 of the adhesive of the present invention referred to hereinafter as "the above-described adhesive" described above with reference to the first embodiment in a ring-shaped support step 150 formed in back cover frame 15.

A rubber packing 13 is mounted between the body 10 and back cover frame 15 to provide a waterproofing function between body 10 and back cover frame 15.

In the second embodiment, because adhesive layer 17 is present on the back side of wrist watch 200, which is always exposed to sweat or the like, good water resistance is required. The adhesive of adhesive layer 17 of the present invention exhibits the above-mentioned excellent effects.

Figure 3:
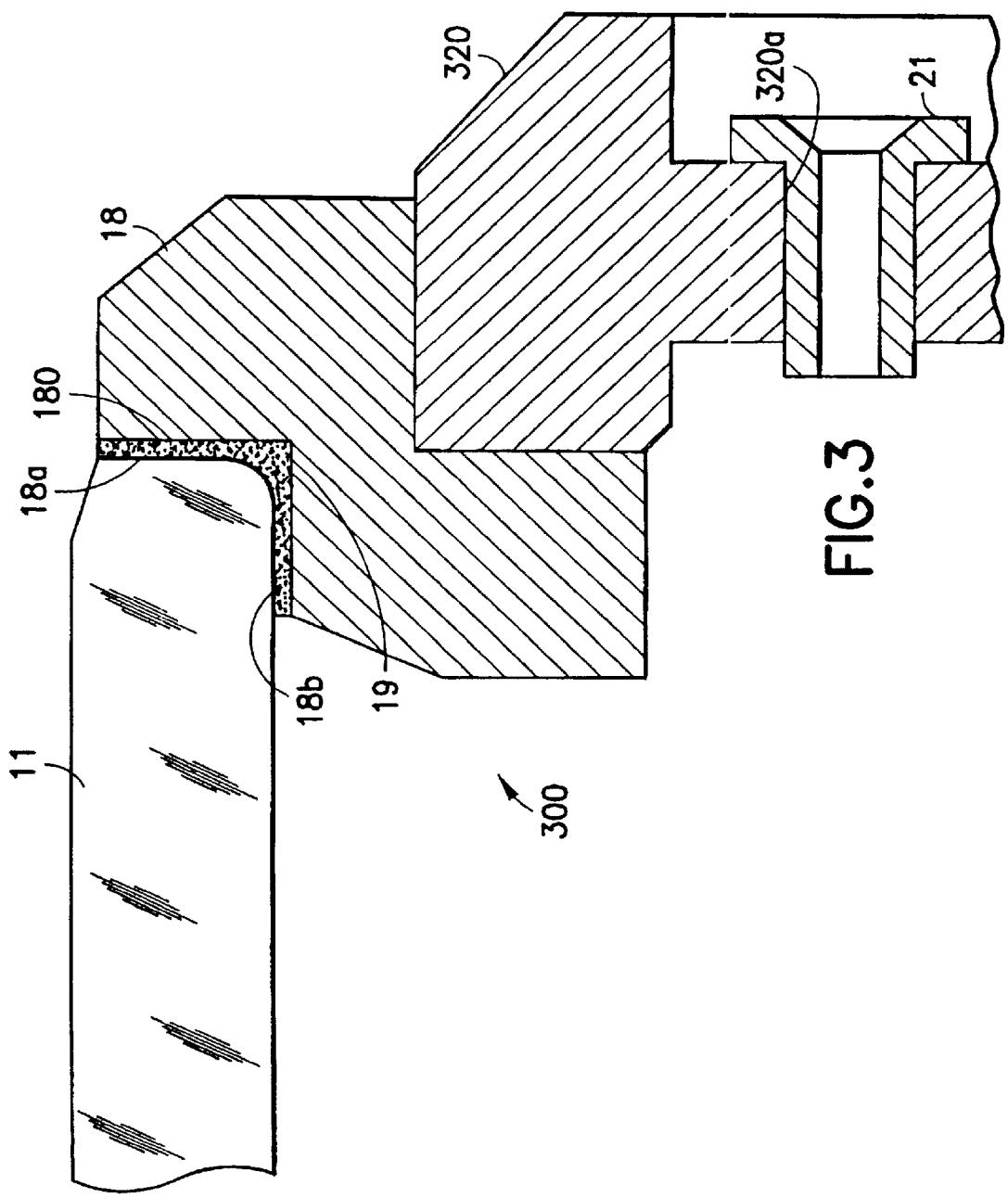
FIG. 3 is a partial sectional view showing the construction of a third embodiment of the present invention.

FIG. 3 shows the structure of a watch 300 in accordance with a third embodiment of the present invention. In the upper portion of the inner edge of an annular general glass edge 18 is placed a support step 180. The above-described adhesive is coated on a pair of inner faces 18a and 18b of support step 180 to form an adhesive layer 19. The outer edge of a cover glass 11 is bonded and fixed to inner faces 18a and 18b of support step 180 of glass edge 18 through adhesive layer 19.

In this embodiment, glass edge 18 and a body 320, and body 320 and a core insertion pipe 21 inserted into an axial hole 320a of the body 320 can be bonded together with the above-described adhesive (not shown). However, the adhesive used in this embodiment is preferably provided with heat curability or anaerobic curability.

Figure 4:
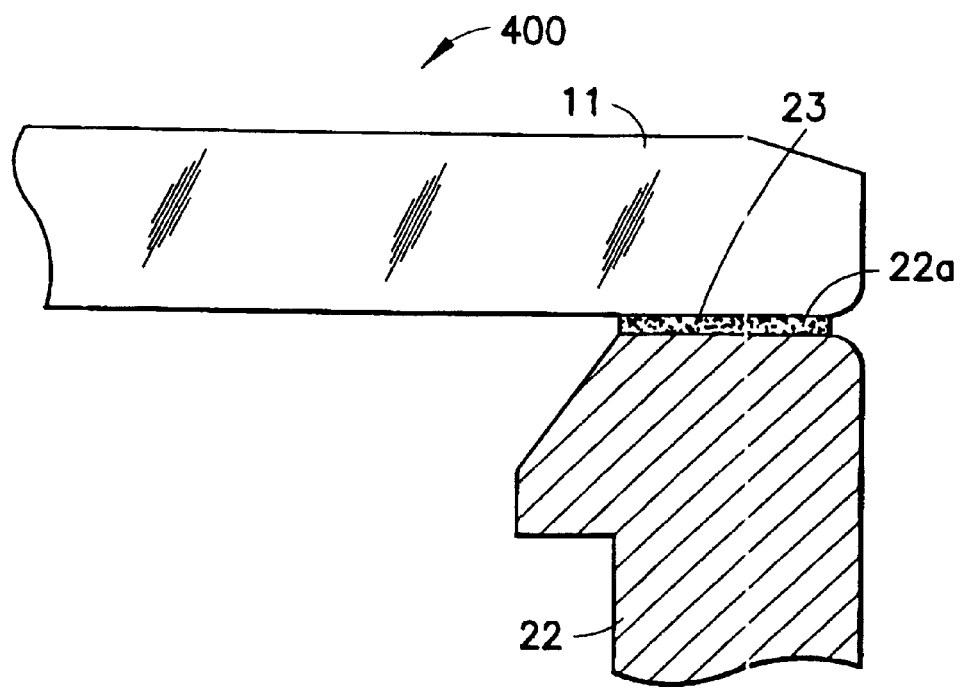
FIG. 4 is a partial sectional view showing the construction of a fourth embodiment of the present invention.

FIG. 4 shows the structure of watch 400 constructed in accordance with a fourth embodiment of the invention. In watch 400, no support step is formed in a body 22, and the outer edge of the lower face of cover glass 11 is bonded to an upper face 22a of body 22 through an adhesive layer 23 of the above-described adhesive.

As described above in the first embodiment, the adhesive of the present invention permits strong adhesion with high water resistance without the support step provided, and thus permits a very simple structure for securing properties of waterproofness and durability, as compared with a conventional structure. Therefore, the adhesive of the present invention improves the ease of working of watch exterior parts, and contributes to thinning of a wrist watch. In this case, peeling resistance can be improved by increasing the adhesion width between cover glass 11 and body 22.

Figure 5:
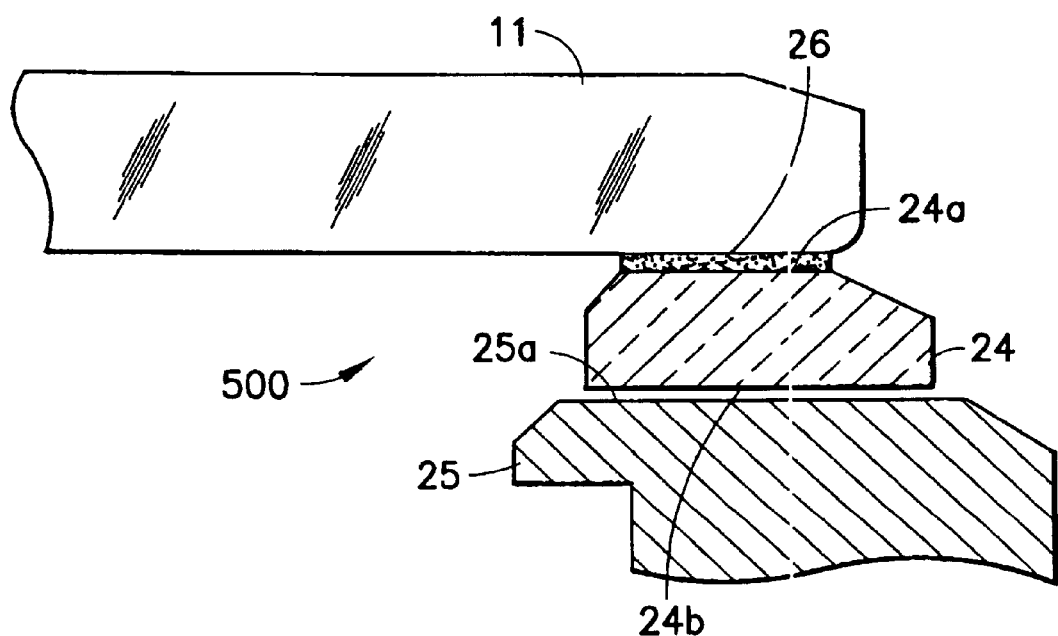
FIG. 5 is a partial sectional view showing the construction of a fifth embodiment of the present invention.

FIG. 5 shows the structure of a watch 500 constructed in accordance with a fifth embodiment of the invention. In this embodiment, a cover glass 11 is attached to a body 25 through a glass edge 24. However, this embodiment is different from the third embodiment in the point that no support step is formed in the glass edge 24.

In this embodiment, like the fourth embodiment, the outer edge of the lower face of cover glass 11 is bonded and fixed to an upper face 24a of glass edge 24 through an adhesive layer 26 of the above-described adhesive.

A lower face 24b of glass edge 24 and an upper face 25a of body 25 can also be bonded and fixed with the above-described adhesive to which heat curability or anaerobic curability is imparted.

Figure 6:
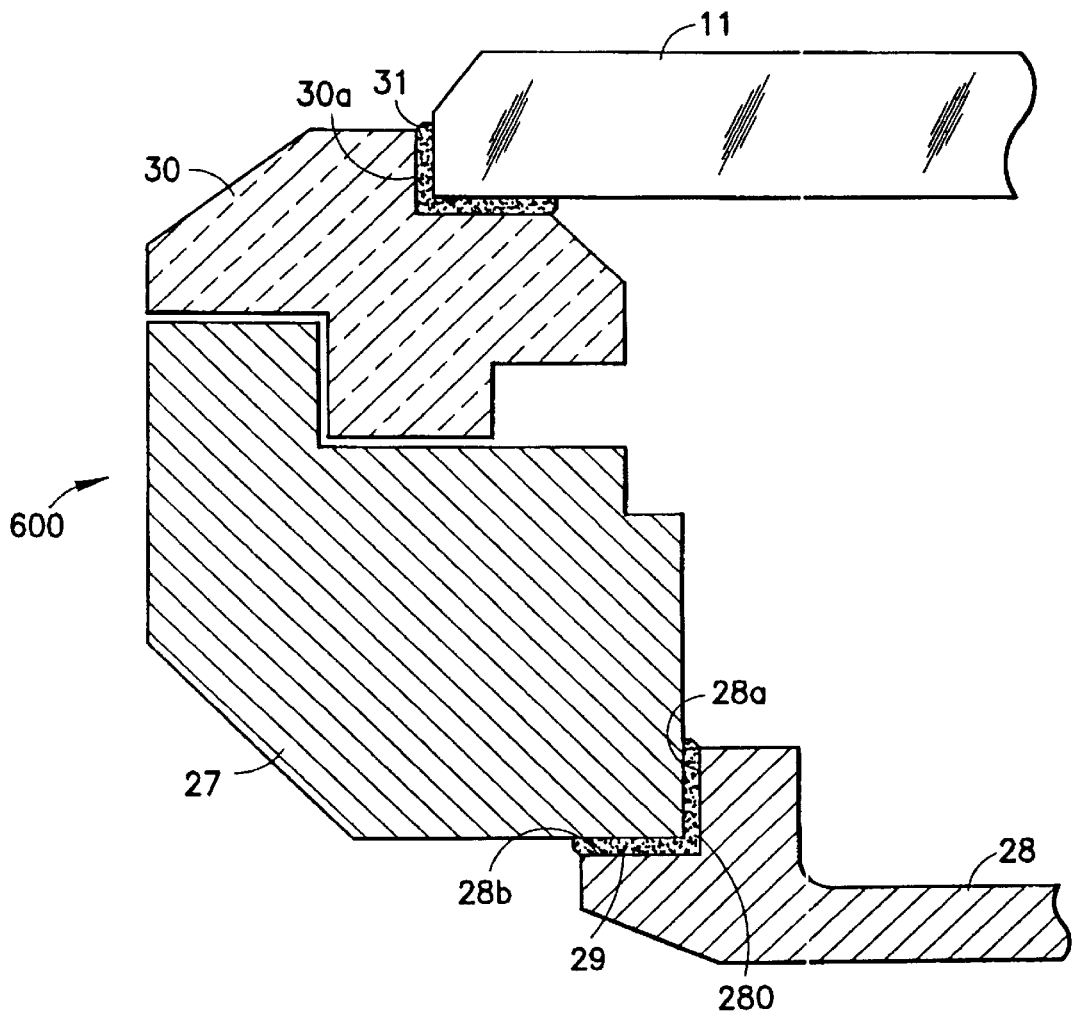
FIG. 6 is a partial sectional view showing the construction of a sixth embodiment of the present invention.

FIG. 6 shows the structure of a watch 600 constructed in accordance with a sixth embodiment of the invention. In this embodiment, heat curability or anaerobic curability is imparted to a pair of inner faces 28a and 28b of a support step 280 of a back cover 28, and a body 27 and back cover 28 are bonded and fixed with an adhesive layer 29 of the above-described adhesive.

A glass edge 30 mounted to body 27 and cover glass 11 are also bonded and fixed together with an adhesive layer 31 of the above-described adhesive in a support step 30a formed in glass edge 30, as in the above-mentioned third embodiment.

Glass edge 30 and body 27 can also be bonded and fixed with the above-described adhesive to which heat curability or anaerobic curability is imparted.

Figure 7:
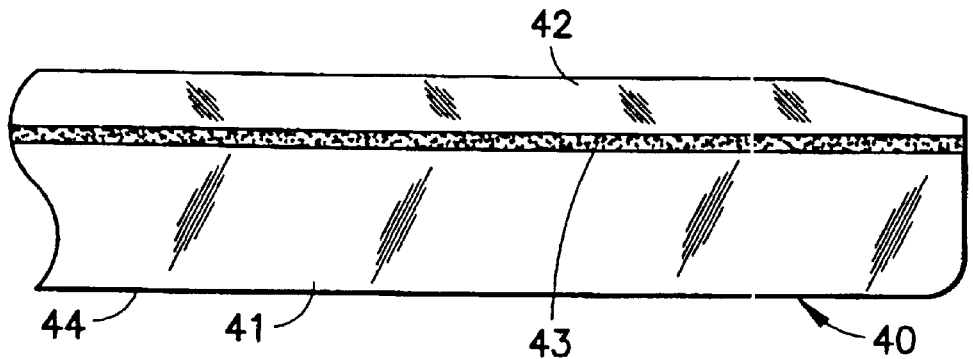
FIG. 7 is a partial sectional view showing the construction of a seventh embodiment of the present invention.

FIG. 7 shows the structure of a bonded member constructed in accordance with a seventh embodiment of the invention. In this embodiment, a first glass plate (first member) 41 and a second glass sheet (second member) 42 are bonded through an adhesive layer 43 of the above-described adhesive to form a laminated glass 40. Although usage of laminated glass 40 is not limited, in this embodiment, the same watch cover glass as described above is shown, and will be described below as a representative example.

First glass sheet 41 and second glass sheet 42 may be different or the same. "Different" as used herein means that both glass sheets are different in at least one condition including the composition (including the crystal structure), physical properties, dimensions (for example, the thickness and the outer diameter), the manufacturing method, the working method, the presence of surface treatment, etc. Of these conditions, the physical properties mean at least one of physical properties (for example, density, specific gravity, various mechanical strengths, hardness, elasticity, brittleness or toughness, shock value, thermal expansion coefficient, etc.), chemical properties (for example, melting point, softening point, chemical resistance, water repellency, etc.), optical properties (for example, color (transmitted light spectrum), refractive index, transmittance of light, reflectance, polarization direction, etc.), electric or magnetic properties (for example, conductivity, dielectric constant, magnetic permeability, etc.), and so forth.

When the first glass plate 41 and the second glass plate 42 are different, there is the advantage that integrated laminated glass 40 has the properties of both glass plates. This will be described below with reference to examples.

For example, soda glass, borosilicate glass or the like can be used for first glass plate 41, and sapphire glass can be used for second glass plate 42. In this case, the second glass plate 42 has high hardness and excellent marring resistance from the viewpoint of the material properties thereof, and thus functions as protective glass. On the other hand, first glass plate 41 has lower hardness than the second glass plate 42, but has the advantages of excellent workability and low cost. First glass plate 41 is bonded to the relatively thin second glass plate 42 to secure the rigidity and strength of the whole cover glass, i.e., laminated glass 40.

In this construction, the cost can be reduced by decreasing the amount of the expensive sapphire used, as compared with a case where the whole glass cover is made of sapphire glass, and, in working of a back side 44 of the cover glass, such as cutting, grinding, polishing, etching, roughing, recessing, rough surface working, or the like, or surface treatment such as formation of a thin film such as a deposit or the like, workability is excellent.

In such a laminated cover glass 40, adhesive layer 43 comprises the above-described adhesive, and thus cover glass 40 exhibits excellent water resistance and/or moisture resistance, shock resistance and waterproofness and/or moisture proofness even when exposed to outside air and water, and this effect is maintained for a long period of time. Therefore, laminated cover glass 40 is suitable for %waterproof watches, particularly, diver's watches, which are required to have high waterproofness and shock resistance.

When first glass plate 41 and second glass plate 42 are different types, for example, stress occurs between both plates due to a difference between the thermal expansion coefficients of both plates. However, since the adhesive which constitutes adhesive layer 43 has high adhesive strength and excellent water resistance, and maintains predetermined flexibility for a long period of time, it is possible to resist the stress or absorb the stress to relieve it, and prevent the occurrence of defects such as peel and the like. From this point of view, the adhesive is suitable for bonding different materials.

Figure 8:
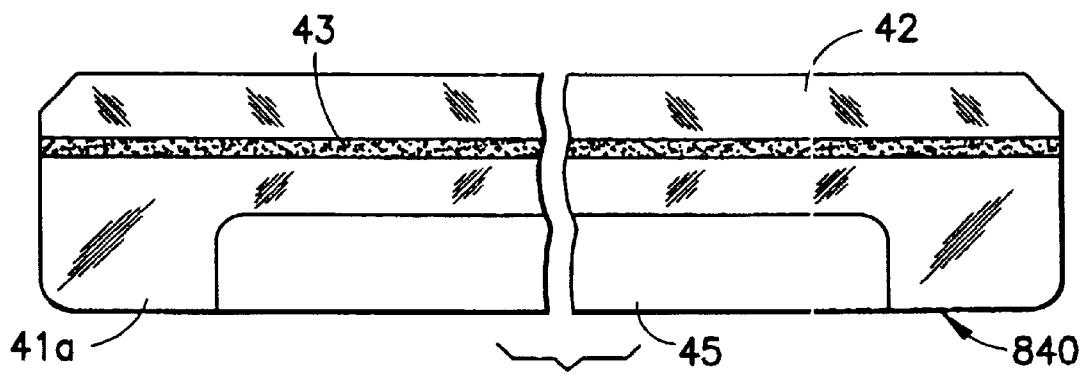
FIG. 8 is a partial sectional view showing the construction of an eighth embodiment of the present invention.

FIG. 8 shows the structure of an eighth embodiment of the invention. In this embodiment, a first glass plate 41a and second glass plate 42 are bonded through adhesive layer 43 of the above-described adhesive to form a laminated glass 40 as a watch cover glass. In this case, first glass plate 41a and second glass plate 42 comprise different materials, which may be the same as the constituent materials described in, for example, the seventh embodiment.

In the eighth embodiment, the back side of first glass plate 41a is not flat, but has a substantially cylindrical recess 45 to form a box-like shape.

Figure 9:
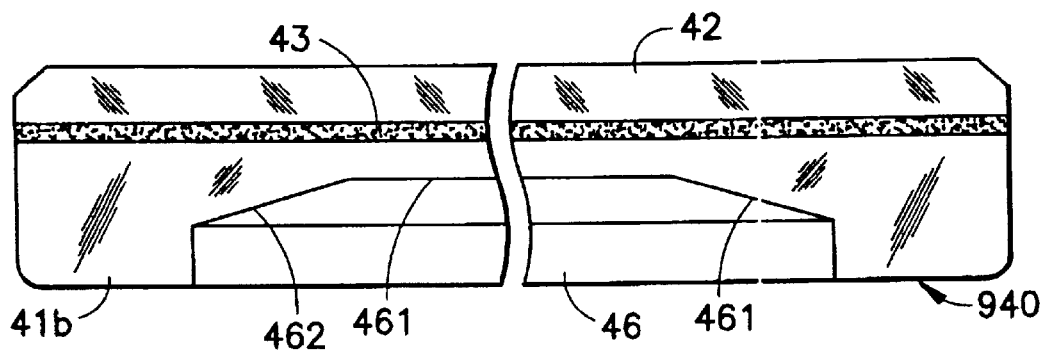
FIG. 9 is a partial sectional view showing the construction of a ninth embodiment of the present invention.

FIG. 9 shows the structure of a ninth embodiment of the invention. In this embodiment, a first glass plate 41b and second glass plate 42 are bonded through an adhesive layer 43 of the above-described adhesive to form a laminated glass 940 as a watch cover glass. In this case, first glass plate 41b and second glass plate 42 comprise different materials, which may be the same as the constituent materials described in, for example, the seventh embodiment.

In the ninth embodiment, a cut recess 46 is formed on the back side of first glass plate 41b. In this case, unlike the recess 45, the depth of the recess 46 changes partially. Namely, an outer periphery 462 of recess 46 has a tapered shape in which the depth gradually decreases from a central portion 461 of recess 46 to the outer periphery thereof. Tapered outer periphery 462 produces the function as a prism due to refraction of light. Therefore, the cover glass of this embodiment exhibits high decorativeness.

Figure 10:
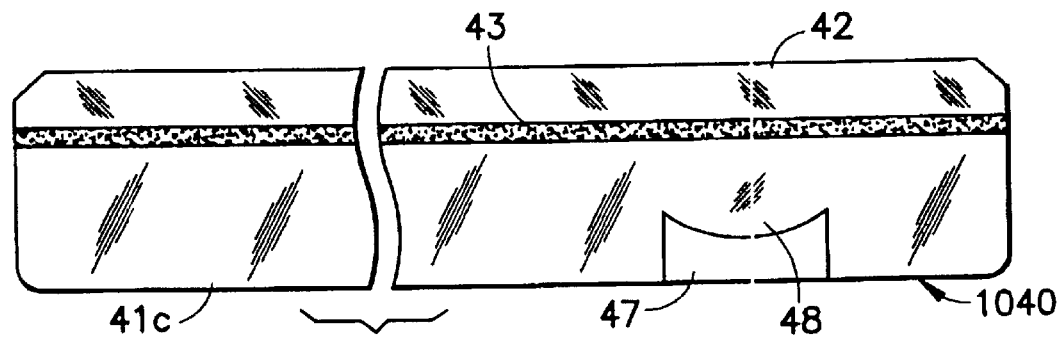
FIG. 10 is a partial sectional view showing the construction of a tenth embodiment of the present invention.

FIG. 10 shows the structure of a tenth embodiment of the invention. In this embodiment, a first glass plate 41c and second glass plate 42 are bonded through an adhesive layer 43 of the above-described adhesive to form a laminated glass 1040 as a watch cover glass. In this case, first glass plate 41c and second glass plate 42 comprise different materials, which may be the same as the constituent materials described in, for example, the seventh embodiment.

In the tenth embodiment, a recess 47 is formed at a predetermined position on the back side of first glass plate 41c by press forming to form a lens 48 for enlarging a calendar display in this portion.

In the laminated cover glasses of the eighth to tenth embodiments, second glass plate 42 preferably comprises a glass material having excellent marring resistance, such as sapphire glass, and the first glass plates 41a, 41b and 41c preferably comprise a glass material having excellent formability or workability. This has the following advantages:

When the whole cover glass comprises sapphire glass, since the material has high hardness, the recess 45, 46 or 47 cannot be easily formed by grinding or the like, or the working precision and surface finishing precision become low, thereby causing an increase in cost due to an increase in the labor of working. Particularly, sapphire glass has a high softening point, and thus cannot be press-formed, and it is difficult to integrally form the recess 45, 46 or 47. On the other hand, the laminated cover glass can be subjected to press forming, and the recess 45, 46 or 47 can easily be formed in the first glass plate 41a, 41b or 41c, which can easily be worked by grinding or the like. It is thus possible to form a complicated shape or a fine recess, and improve working precision and surface finishing precision.

In manufacture of such a laminated cover glass, either of bonding between the first glass plate 41a, 41b or 41c and the second glass plate 42 and formation of the recess 45, 46 or 47 in the first glass plate 41a, 41b or 41c may be carried out earlier than the other.

Figure 11:
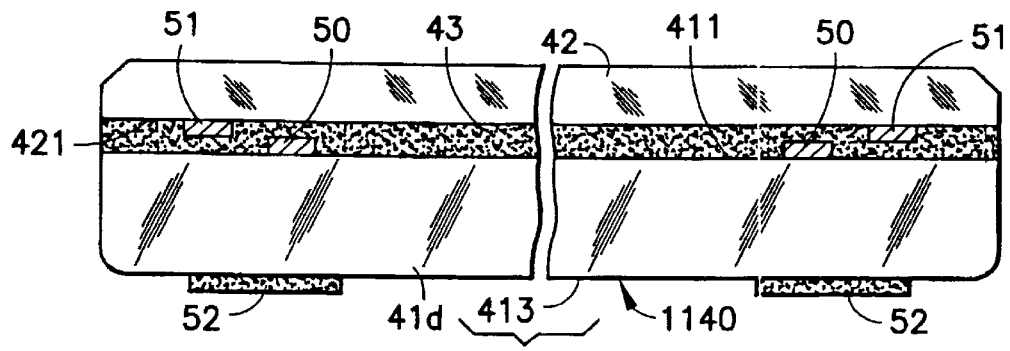
FIG. 11 is a partial sectional view showing the construction of an eleventh embodiment of the present invention.

FIG. 11 shows the structure of an eleventh embodiment of the invention. In this embodiment, a first glass plate 41d and second glass plate 42 are bonded through adhesive layer 43 of the above-described adhesive to form a laminated glass 1140 as a watch cover glass. In this case, first glass plate 41d and second glass plate 42 comprise different materials or the same material, which may be the same as the constituent materials described in, for example, the seventh embodiment.

In the eleventh embodiment, a pair of display layers (decorative member layers) 50 and 51 are provided between first glass plate 41d and second glass plate 42. Namely, display layers 50 and 51 are formed on a bonded face 411 of the first glass plate 41d and a bonded face 421 of second glass plate 42, respectively.

Each of display layers 50 and 51 has a predetermined display pattern such as a character, numeral, a symbol, a design or the like, which is formed by a method such as coating, printing, transfer, deposition, sputtering, ion plating, CVD or the like.

Also each of display layers 50 and 51 may be formed by using a decorative member having poor water resistance, chemical resistance, abrasion resistance and flaw resistance, such as a shell, paper, a cloth or the like. Such a member can be inserted to form a decorative glass having high decorativeness and good quality.

Alternatively, only one of display layers 50 and 51 may be provided.

A conventional cover glass comprising a single glass material has a problem in that when a display layer is formed on the outer surface by printing, coating or the like, the display disappears over time due to deterioration or peeling. However, in this embodiment, display layers 50 and 51 arc *formed between first glass plate 41d and second glass plate 42 and not exposed to the outer surface of cover glass 1140, this problem can be solved.

Formation of such display layers 50 and 51 has the advantage that predetermined information can be displayed for a long period of time, and the advantage that the stereoscopy of the cover glass can be visually expressed, thereby increasing the quality and number of variations of the design.

As shown in FIG. 11, a display layer 52 similar to layers 50 or 51 can be formed on a lower side 413 of first glass plate 41d. This permits display of predetermined indications at different positions in the depth direction of the cover glass, and thus permits higher stereoscopic expression.

Figure 12:
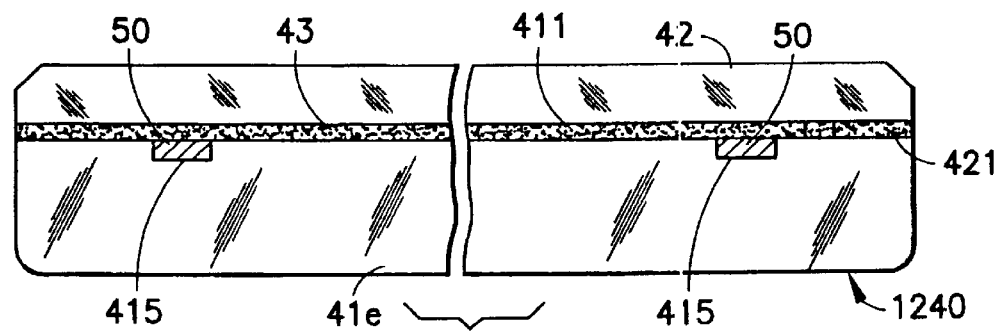
FIG. 12 is a partial sectional view showing the construction of a twelfth embodiment of the present invention.

FIG. 12 shows the structure of a twelfth embodiment of the invention. This embodiment is the same as the eleventh embodiment except that a recess 415 such as a groove, a hole or the like is formed in first glass plate 41e, and a display layer 50 is provided in recess 415 to yield a glass cover 1240.

This embodiment enables suppression of the occurrence of bubbles in the vicinity of a decorative member layer during bonding, and improvement in the workability of bonding. Also, since display layer 50 is not projected into adhesive layer 43, the thickness of adhesive layer 43 can be made uniform. As a result, this embodiment prevents peeling which is caused by internal stress due to the nonuniformity in the thickness of the adhesive layer during curing.

Although not shown in the drawing, an intermediate layer may be provided for any desired purpose in addition to display at the same position as display layers 50 and 51, for example.

Figure 13:
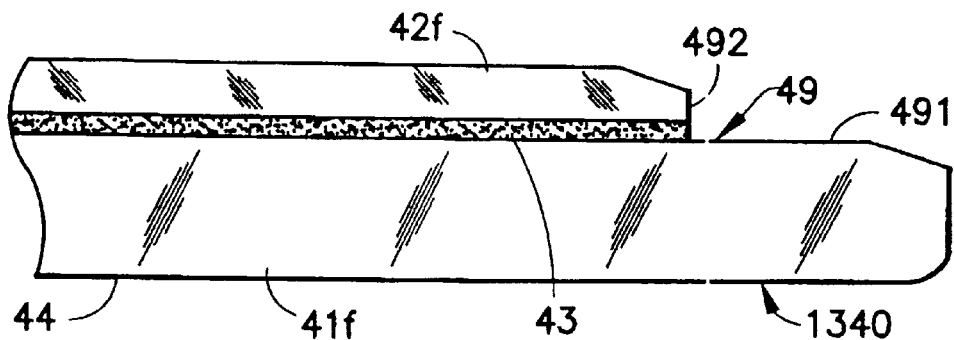
FIG. 13 is a partial sectional view showing the construction of a thirteenth embodiment of the present invention.

FIG. 13 shows the structure of a thirteenth embodiment of the invention. In this embodiment, a first glass plate 41f and a second glass plate 42f are bonded through an adhesive layer 43 of the above-described adhesive to form a laminated glass 1340 as a watch cover glass. In this case, first glass plate 41f and second glass plate 42f comprise different materials or the same material, which may be the same as the constituent materials described in, for example, the seventh embodiment.

In the thirteenth embodiment, the outer diameter of first glass plate 41f is larger than the outer diameter of glass plate 42f so that a step 49 is formed in the outer periphery of the second glass plate 42f by this difference between the diameters.

When a cover glass having such a shape is formed by using single glass, especially hard glass such as sapphire glass or the like, it is difficult to form step 49, and even if step 49 can be formed, the constituent faces of step 49 cannot be smoothly ground. However, in laminated glass 1340 of this embodiment, since first glass plate 41f and second glass plate 42f are produced separately, worked in desired shapes, and then bonded together, it is possible to easily obtain a cover glass having the complicated shape of cover 1340 shown in FIG. 13. Specifically, the constituent faces 491 and 492 of step 49 can be ground smoothly. Therefore, the working precision and dimensional precision of the step and other portions are high.

Figure 14:
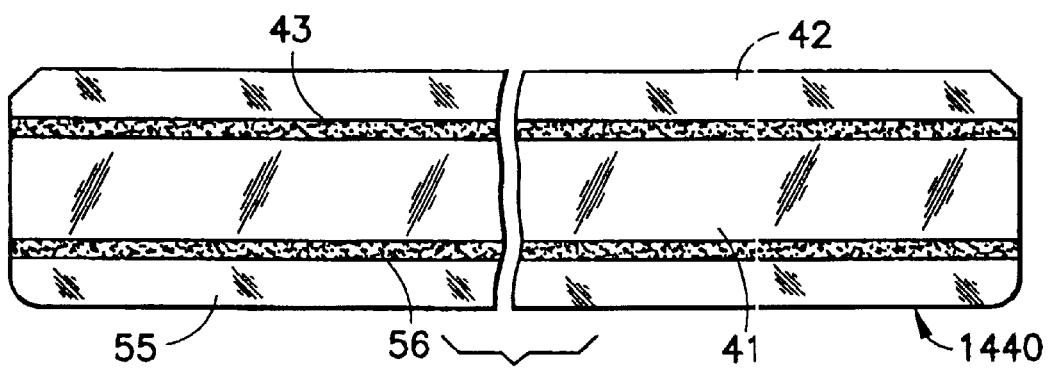
FIG. 14 is a partial sectional view showing the construction of a fourteenth embodiment of the present invention.

FIG. 14 shows the structure of a fourteenth embodiment of the invention. In this embodiment, first glass plate 41 and second glass plate 42 are bonded through an adhesive layer 43 of the above-described adhesive, and first glass plate 41 and a third glass plate 55 are bonded through an adhesive layer 56 of the above-described adhesive to form a laminated glass 1440 as a watch cover glass. In this case, third glass plate 55 may be the same as either of first glass plate 41 and second glass plate 42, or different from first glass plate 41 and second glass plate 42.

Thus, the cover glass or laminated glass may be a laminate of at least two, three or four glass plates. In addition, at least two structures of the first to fourteenth embodiments may be combined.

Besides use as a watch cover glass, examples of applications of the adhesive-fixed body of the present invention, particularly the laminated glass, include a liquid crystal display (TFT liquid crystal display cell and the like), CRT, window and door glass, automobile glass, spectacle lenses, other various lenses, water tank glasses for appreciating fish, tableware, portable telephones, display window cover glasses for remote controllers, display window cover glasses for azimuth meters and other measuring instruments, etc.

The present invention is not limited to bonding of the above glass materials, and combination of any materials for the first and second members can be used. In this case, when different materials are bonded, of course, the same effect as described above can be obtained.

EXAMPLES

The present invention is described below with reference to examples for purposes of illustration.

In the examples, any one of the following three types was used as component a.

i) Polytetramethylene diacrylate produced by esterification reaction of a mixture of 1 mole of polytetramethylene glycol having a molecular weight of 3000 and 2 moles of acrylic acid.

ii) Polytetramethyleneurethane diacrylate (with (x) attached in Table 1 below) produced by reacting a mixture of 0.6 mole of polytetramethylene glycol having a molecular weight of 2000 and 1 mole of tolylene diisocyanate, and then adding 0.8 mole of 2-hydroxyethyl acrylate to the reaction product and reacting the resultant mixture.

iii) Polytetramethyleneurethane diacrylate (with (y) attached in Table 1 below) produced by reacting a mixture of 0.85 mole of polytetramethylene glycol having a molecular weight of 2000 and 1 mole of tolylene diisocyanate, and then adding 0.3 mole of 2-hydroxyethyl acrylate to the reaction product and reacting the resultant mixture.

The ratio of polytetramethylene glycol and acrylic acid and the ratio of polytetramethylene glycol and tolylene diisocyanate can appropriately be changed. By changing these ratios, viscosity before curing and hardness after curing can be changed.

On the other hand, in comparative examples, any one of the following two types was used as a component corresponding to the above component.

iv) Polybutadiene acrylate produced by esterifying a mixture of 1 mole of polybutadiene glycol having a molecular weight of 3000 and 2 moles of acrylic acid.

v) Polypropyleneurethane diacrylate produced by reacting 0.6 mole of polypropylene glycol having a molecular weight of 2000 and 1 mole of tolylene diisoyaiate, and then adding 0.8 mole of 2-hydroxyethyl acrylate to the reaction product and reacting the mixture.

As component b, isobornyl methacrylate, isobornyl acrylate, dicyclopentenyl acrylate, 2-hydroxyethyl methacrylate, 2-hydroxyethyl acrylate or tetrahydrofurfuryl acrylate were used by appropriately mixing the combination shown in Table 1 below.

As component c, γ-methacryloxypropyl trimethoxysilane or (-glycidoxypropyl trimethoxysilane was used according to demand.

As component d, 2-hydroxy-2-methyl-1-phenylpropane-1-one or benzoin ethyl ether was used.

Six adhesives (Nos. 1 to 6) of the examples, and three adhesives (Nos. 7 to 9) of the comparative examples each comprising the above components were prepared, and characteristics of these adhesives were evaluated. The compositions of these nine adhesives are shown in Table 1.

TABLE 1

| Adhesive Composition | Adhesive No. | Example | | | | | | Comparative Example | | |
|---|---|---|---|---|---|---|---|---|---|---|
| | | 1 | 2 | 3 | 4 | 5 | 6 | 7 | 8 | 9 |
| a Component | Polytetramethylene diacrylate | 100 | 100 | | | 100 | | | | |
| | Polytetramethyleneurethane diacrylate (x) | | | 100 | 100 | | | 100 | | |
| | Polytetramethyleneurethane diacrylate (y) | | | | | | 100 | | | |
| a Component | Polybutadiene diacrylate | | | | | | | | 100 | |
| | Polypropyleneurethane diacrylate | | | | | | | | | 100 |
| b Component | Isobornyl methacrylate | 40 | | 80 | | 10 | 80 | | 40 | |
| | Isobornyl acrylate | | 40 | | 80 | 10 | 80 | | | 80 |
| | Dicyclopentenyl acrylate | | | | | | | 80 | | |
| | 2-hydroxyethyl methacrylate | 40 | | 60 | | 20 | | 60 | 40 | 60 |
| | 2-hydroxethyl acrylate | | 40 | | 60 | 10 | 60 | | | |
| | Tetrahydrofurfuryl acrylate | 40 | 40 | 60 | 60 | 20 | 20 | 60 | 40 | 60 |
| c Component | γ-methacryloxypropyl trimethoxy silane | 2 | 2 | 3 | | 1 | 15 | | 3 | |
| | γ-glycidoxypropyl trimethoxy silane | | | | 3 | | | | | |
| d Component | 2-Hydroxy-2-methyl-1-phenylpropane-1-one | 4 | 4 | 6 | | 2 | 15 | 4 | 4 | 6 |
| | Benzoin ethyl ether | | | | 6 | | | | | |

(Numerals in the table are shown by parts by weight.)

All Adhesive Nos. 1 to 6 contain component a of the present invention, and Adhesive Nos. 7 to 9 do not contain component a. Adhesive No. 7 contains neither isobornyl methacrylate nor isobornyl acrylate.

Components b of all Adhesive Nos. 1 to 6 contain isobornyl methacrylate and/or isobornyl acrylate, and the ratios of these compounds in components b are adjusted within the range of 28 to 80 parts by weight.

The characteristics and results of a bonding test of Adhesive Nos. 1 to 9 are shown in Table 2.

TABLE 2

| Test Item | Adhesive No. | Example | | | | | | Comparative Example | | |
|---|---|---|---|---|---|---|---|---|---|---|
| | | 1 | 2 | 3 | 4 | 5 | 6 | 7 | 8 | 9 |
| Viscosity | (cps) at 25° C. | 1000 | 900 | 1400 | 1350 | 2900 | 1000 | 1300 | 2500 | 850 |
| Hardness | Shore D at 25° C. | 60 | 55 | 50 | 45 | 45 | 70 | 50 | 60 | 45 |
| Curing test | Ultraviolet dose 2000 mJ/cm$^2$ | ○ | ○ | ○ | ○ | ○ | ○ | ○ | x | x |
| Adhesive strength of watch glass | Initial adhesive strength (kg) | 80 | 75 | 70 | 80 | 68 | 88 | 82 | 78 | 68 |
| | 50° C. · hot water 100 hr | 62 | 56 | 52 | 63 | 50 | 72 | 28 | 55 | 25 |
| | Heat cycle 10 C/S −30 60° C. | 85 | 78 | 72 | 63 | 69 | 62 | 75 | 30 | 40 |
| Water penetration test of watch | 50° C. · hot water 100 hr | ○ | ○ | ○ | ○ | ○ | ○ | x | ○ | x |
| | 50° C. · 100 hr · 10 atm | ○ | ○ | ○ | ○ | ○ | ○ | x | x | x |
| Shock resistance | 1 m falling to an oak plate | ○ | ○ | ○ | ○ | ○ | ○ | ○ | x | ○ |

In Table 2, viscosity was measured at 25° C. for each adhesive before curing by using a Brookfield rotational viscometer.

Hardness was Shore hardness according to JIS B 7727, and was measured at 25° C. after curing.

The curing test was carried out by ultraviolet irradiation at a dose of 2000 mJ/cm$^2$, and surface curability after irradiation was observed. "○" marks indicate the absence of stickiness, and "x" marks indicate the presence of remaining stickiness.

Regarding to adhesive strength, after the body of a watch case and a glass were bonded with the above-described adhesive, the initial strength, strength after immersion in hot water at 50° C. for 100 hours, and strength after ten repetitions of a cycle in which a sample was held at −30° C. for 1 hour and at 60° C. for 1 hour were measured.

In the water penetration test, a watch body and a glass were bonded with the above-described adhesive, and penetration of water was confirmed when the watch was immersed in hot water at 50° C. for 100 hours and when the watch was immersed in hot water at 50° C. for 100 hours under 10 atm. "○" marks indicate no water penetration, "Δ" marks indicate penetration of a small amount of water, and "x" marks indicate water penetration.

The shock resistance was measured by confirming the presence of water penetration due to peel or cracks of the adhesive when the same watch as described above was fallen onto an oak plate from a height of 1 m and then immersed in water at room temperature for 40 minutes under 10 atm. "○" marks indicate no water penetration due to peeling or cracking of the adhesive, "Δ" marks indicate penetration of a small amount of water due to peeling or cracking of the adhesive, and "x" marks indicate water penetration due to peeling or cracking of the adhesive.

Table 2 shows that both Adhesive Nos. 8 and 9 have poor surface curability, cause deterioration in adhesive force after the heat cycle test, and cannot resist the 10-atm waterproof test.

On the other hand, all Adhesive Nos. 1 to 7 have good surface curability, and cause substantially no deterioration in adhesive force after the heat cycle test. However, although Adhesive Nos. 1 to 6 cause no deterioration in adhesive force after the hot water test, and no trouble in the waterproof test, Adhesive No. 7 exhibits significant deterioration in adhesive force after the hot water test and shows poor results of the waterproof test.

Next, each of Adhesive Nos. 1 to 4 was coated on the bonded portions of the body 10 and the cover glass 11 of the watch case having the structure shown in FIG. 1, and cured by irradiation of ultraviolet rays with a wavelength of 350 nm and a quantity of light of 8000 mJ/cm$^2$ using an ultraviolet irradiation apparatus comprising a high-pressure mercury lamp to bond and fix the cover glass 11 to the body 10. The average thickness of the adhesive layer was 50 μm.

The thus-obtained Examples 1 to 4 (corresponding to Adhesive Nos. 1 to 4, respectively) were tested with respect to waterproofness in comparison with the same watch case (simply referred to as "conventional example" hereinafter) formed by using the adhesive disclosed as Example 1 in Japanese Examined Patent Publication No. 7-98674. The results are shown in Table 3.

The conventional example causes no trouble as an adhesive-fixed structure used for a wrist watch with light water resistance. The schematic composition of the adhesive used in the conventional example comprises 100 parts by weight of urethane methacrylate not having polytetramethylene oxide, 30 parts by weight of 2-hydroxypropyl acrylate, 30 parts by weight of isobornyl methacrylate, 30 parts by weight of rosin ester, 5 parts by weight of acrylic acid, and 0.5 part by weight of benzoin. Although this adhesive has relatively high resistance and durability compared to many ultraviolet curable resin adhesive, the adhesive has low water resistance and a drawback in temperature properties, particularly heat resistance, as compared with the adhesive of the present invention.

TABLE 3

| Test Item | | Example 1 | Example 2 | Example 3 | Example 4 | Conventional Example |
|---|---|---|---|---|---|---|
| Static pressure waterproofness | | 15 atm OK | 15 atm OK | 15 atm OK | 15 atm OK | 5 atm OK |
| Long-term waterproofness | | 1000 hr OK | 1000 hr OK | 1000 hr OK | 1000 hr OK | 100 hr OK |
| Shock waterproofness | | Vinyl tile OK | Vinyl tile OK | Vinyl tile OK | Vinyl tile OK | Oak plate OK |
| Heat resistant waterproofness | | 90° C. OK | 90° C. OK | 90° C. OK | 90° C. OK | 80° C. OK |
| Adhesive strength durability of watch glass | 24 hr | 80% | 80% | 80% | 80% | 65% |
| | 50 hr | 80% | 80% | 80% | 70% | 50% |
| | 100 hr | 80% | 80% | 80% | 70% | 40% |

TABLE 3-continued

| Test Item | Example 1 | Example 2 | Example 3 | Example 4 | Conventional Example |
|---|---|---|---|---|---|
| Water resistance | 500 hr OK | 500 hr OK | 500 hr OK | 500 hr OK | 200 hr OK |
| Thermal shock waterproofness | 85° C. 240C | 85° C. 240C | 85° C. 240C | 85° C. 240C | 60° C. 20C |
| Weather resistance + shock waterproofness | ○ | ○ | ○ | ○ | x |

The test items and test results shown in Table 3 will be described below.

The static pressure waterproof test confirmed whether or not clouding condensation due to water condensation occurs on the inner surface of the cover glass when the entire watch case was heated to 45° C. after being maintained in water for 20 minutes, and then a wet cloth at 20° C. was placed on the cover glass.

When no clouding occurred, the pressure in water was further increased, and the test repeated. The pressure shown in Table 3 indicates the highest pressure value where no clouding occurred.

The initial pressure in water was 3 atm, and waterproofness was confirmed each time the pressure was increased by 2 atm.

In all Examples 1 to 4, no trouble occurred up to 15 atm, and the back cover was deformed under pressure over this value. Therefore, confirmation was not carried out under pressure over 15 atm. In the conventional example, no trouble occurred up to 5 atm, but clouding occurred at pressures over this value.

Long-term waterproofness was measured by determining the immersion time taken until clouding occurred by the same condensation method as described above when the watch case was immersed in water at room temperature and taken out at intervals of 50 hours.

In all Examples 1 to 4, no clouding occurred up to 1000 hours. The test was stopped at an immersion time of 1000 hours. In the conventional example, clouding occurred after an immersion time of 100 hours.

Shock waterprooffess was tested by confirming waterproofness in water under 10 atm after the watch case was dropped onto an oak plate from a height of 1.2 m. When no trouble occurred in waterproofness in falling onto the oak plate, the watch case was then dropped onto a vinyl tile 50 times from a height of 1.2 m, and then waterproofness in water under 10 atm was confirmed by the same method.

In Examples 1 to 4, waterproofness was maintained after falling onto the oak plate and falling onto the vinyl tile. On the other hand, in the conventional example, no problem occurred after falling onto the oak plate, but clouding occurred after falling onto the vinyl tile.

Heat resistant waterproofness was tested by confirming waterproofness under 10 atm after the watch case was placed in a heated dryer for 1 hour. The initial temperature of the dryer was 40° C., and waterproofness was confirmed each time after the temperature was increased by 10° C.

In Examples 1 to 4, waterproofness was maintained up to 90° C. On the other hand, in the conventional example, waterproofness was maintained up to 80° C., but clouding occurred at 90° C.

Thermal shock waterproofness was tested by confirming waterproofness under 10 atm after 20 cycles in each of which the watch case was alternately placed in two baths of different temperatures for 1 hour each. The lower-temperature side was fixed to −20° C., and the high-temperature side was stepwisely increased to 40° C., 60° C. and 85° C.

In Examples 1 to 4, since waterproofness was obtained at 85° C. on the high-temperature side, waterproofness was further confirmed at the same temperature up to 240 cycles (C). In this case, no problem occurred in waterproofness. On the other hand, in the conventional example, waterproofness was obtained at 60° C. on the high-temperature side, but clouding occurred at 85° C.

Weather was tested by confirming waterproofness under 10 atm after the bonded portion was irradiated with ultraviolet rays by an ultraviolet carbon fadometer. The initial irradiation time of ultraviolet rays was 100 hours, and then increased by 100 hours each to finally reach 500 hours.

In Examples 1 to 4, no problem occurred in waterproofness after irradiation for 500 hours. On the other hand, in the conventional example, waterproofness was maintained up to an irradiation time of 200 hours, but clouding occurred after irradiation for 300 hours. "Weather resistance+shock waterproofness" is a combination of shock resistance and weather resistance tests. Waterproofness under 10 atm was tested after the watch case was irradiated for 200 hours under the same conditions as a confirmation of the weather resistance, and then fallen onto an oak plate 10 times. "○" marks indicate no water penetration, and "Δ" marks indicate water penetration.

In Examples 1 to 4, waterproofness was ensured, while in the conventional example, clouding occurred.

The adhesive strength durability of watch glass is represented by the result of determination of a deterioration rate of adhesive force to the immersion time in a test of accelerated deterioration in durability, which was obtained by comparing the initial adhesive force with the adhesive force after the watch case was immersed in hot water at 40° C.

In Examples 1 to 4, a value of about 70 to 80% was obtained after immersion for 100 hours, while in the conventional example, the adhesive strength rapidly decreased with the immersion time, and decreased to about 40% for 100 hours.

Next, effects of the mixing ratios of the adhesive constituent components were examined. First, relations between the amount of component __compounded in the adhesive and workability of adhesive coating and flexibility after curing of the adhesive were examined.

(1) 2-hydroxyethyl methacrylate (component b) containing 50% by weight of isobornyl methacrylate was mixed with 100 parts by weight of polytetramethylene diacrylate (component a) in each of the mixing amounts shown in Table 4, and 2 parts by weight of y-methacryloxypropyl trimethoxysilane (component b) and 4 parts by weight of 2-hydroxy-2-methyl-1-phenylpropane-1-one (component d) were added to each of the resultant mixtures to prepare adhesives.

The viscosity of each of the uncured adhesives at 25° C. was measured, workability of adhesive coating was evaluated, and the shock resistance or flexibility of the adhesive layer (average thickness: 50 μm) was examined after the body of the watch case and glass were bonded with each of the adhesives, and irradiated with ultraviolet rays to cure the adhesives. The results are shown in Table 4.

TABLE 4

| Amount of b component compounded (parts by weight) | Workability | | Shock resistance (flexibility) | Remarks |
|---|---|---|---|---|
| | Viscosity (cps) | Workability | | |
| 30 | 23000 ± 500 | X | ○ | Comparative Example |
| 40 | 12000 ± 300 | X | ○ | Comparative Example |
| 50 | 4100 ± 200 | Δ | ○ | Example |
| 70 | 2150 ± 200 | ○ | ○ | Example |
| 100 | 1250 ± 100 | ○ | ○ | Example |
| 150 | 960 ± 100 | ○ | ○ | Example |
| 200 | 730 ± 100 | ○ | ○ | Example |
| 250 | 660 ± 100 | ○ | ○ | Example |
| 300 | 530 ± 50 | Δ | Δ | Example |
| 350 | 420 ± 20 | X | X | Comparative Example |
| 400 | 330 ± 20 | X | X | Comparative Example |

Measurement of the viscosity and evaluation of the shock resistance were carried out by the same methods as in Table 2. The workability was evaluated in three stages by combined evaluation of the ease of the work of coating the adhesive, ductility of the adhesive, uniformity of a coating, etc. "○" marks indicate good workability, "Δ" marks indicate somewhat good workability, and "×" marks indicate poor workability.

(2) Adhesives were prepared by the same method as (1) except component a in (1) was changed to polytetramethylene urethane diacrylate, and the same tests were carried out. The results are shown in Table 5.

TABLE 5

| Amount of b component compounded (parts by weight) | Workability | | Shock resistance (flexibility) | Remarks |
|---|---|---|---|---|
| | Viscosity (cps) | Workability | | |
| 30 | 51000 ± 500 | X | ○ | Comparative Example |
| 40 | 24000 ± 500 | X | ○ | Comparative Example |
| 50 | 5300 ± 200 | Δ | ○ | Example |
| 70 | 2900 ± 200 | ○ | ○ | Example |
| 100 | 2150 ± 100 | ○ | ○ | Example |
| 150 | 1630 ± 100 | ○ | ○ | Example |
| 200 | 1400 ± 100 | ○ | ○ | Example |
| 250 | 1120 ± 100 | ○ | ○ | Example |
| 300 | 750 ± 50 | ○ | Δ | Example |
| 350 | 400 ± 30 | Δ | X | Comparative Example |

As shown in Tables 4 and 5, when the amount of component b compounded with component a is less than 50 parts by weight, the viscosities of the uncured adhesives are high (over 6500 cps), and the adhesives are very difficult to coat in a selected location such as a narrow portion, by an ordinary dispenser or the like. Even if the adhesives can be coated by other means, coating nonuniformity (poor uniformity) can occur, and the thicknesses of the adhesive layers cannot be made uniform.

When the amount of component b compounded exceeds 300 parts by weight, the viscosity of the uncured adhesive is excessively low (less than 450 cps), and the adhesive easily flows and is difficult to stay in a predetermined region. Further, when the amount of component b compounded exceeds 300 parts by weight, the flexibility of the cured adhesive deteriorates, and thus cracks occur in the adhesive layer or the bonded faces peel when shock is applied. As a result, waterproofness deteriorates.

It was confirmed from the test results that the compounding ratio of component b to component a is preferably 50 to 300 parts by weight, more preferably 70 to 250 parts by weight, based on 100 parts by weight of component a, Next, the relations between the ratio of isobornyl (meth)acrylate contained in the (meth)acrylic monomer (in this examples, 2-hydroxyethyl methacrylate) as component b, and adhesion, waterproofness and shock resistance were examined.

The amount of isobornyl acrylate compounded in component b was changed to prepare 14 types of components b. To 100 parts by weight of polytetramethylene urethane diacrylate (component a) were added 100 parts by weight of each of components b, 3 parts by weight of γ-glycidoxypropyl trimethoxysilane (component c) and 6 parts by weight of benzoin ethyl ether (component d) to prepare an adhesive.

The body of a watch case and a glass were bonded with each of the adhesives, and then irradiated with ultraviolet rays to cure the adhesive (the average thickness of the adhesive layer: 50 μm). Then, the adhesive strength of the watch glass, the water penetration of the watch and the shock resistance or flexibility were examined. The results are shown in Table 6.

Measurement and evaluation of the adhesive strength of the watch glass, water penetration of the watch and shock resistance were carried out by the same method as in Table 2.

TABLE 6

| Amount of isobornyl acrylate compounded (% by weight) | Adhesive strength of watch glass (kgf/cm$^2$) 50° C. hot water 100 hr | Water penetration test of watch 50° C. 100 hrA10atm | Shock resistance 1 m falling to an oak plate |
|---|---|---|---|
| 25 | 36 | Δ | ○ |
| 28 | 40 | ○ | ○ |
| 30 | 42 | ○ | ○ |
| 35 | 58 | ○ | ○ |
| 40 | 64 | ○ | ○ |
| 45 | 66 | ○ | ○ |
| 50 | 60 | ○ | ○ |
| 55 | 61 | ○ | ○ |
| 60 | 59 | ○ | ○ |
| 65 | 59 | ○ | ○ |
| 70 | 53 | ○ | Δ |
| 75 | 50 | ○ | Δ |
| 80 | 48 | ○ | Δ |
| 85 | 40 | Δ | X |

As shown in Table 6, when the amount of isobornyl acrylate contained in component b is 28 to 80% by weight, the adhesive strength is high, and the water resistance and shock resistance are excellent.

Next, an experiment for examining the adhesive strength of the laminate glass was carried out.

A circular glass plate (thickness 0.4 mm, diameter 29 mm, Vickers hardness Hv=2300) comprising sapphire glass and a circular glass plate (thickness 1.2 m, diameter 29 mm, Vickers hardness Hv=600) comprising soda glass were prepared as an upper plate 61 and a lower plate 62, respectively. In addition, adhesives in Examples 1, 2, 3 and 4 shown in Table 1 and the adhesive of the conventional example shown in Table 3 were prepared. Both glass plates were bonded with each of the adhesives therebetween, and then irradiated with ultraviolet rays to cure the adhesive, to obtain a laminated cover glass 60 for watches 1500 and 1500' shown in FIGS. 15 and 16. The average thickness of the adhesive layer 63 was 15 μm.

Figure 15:
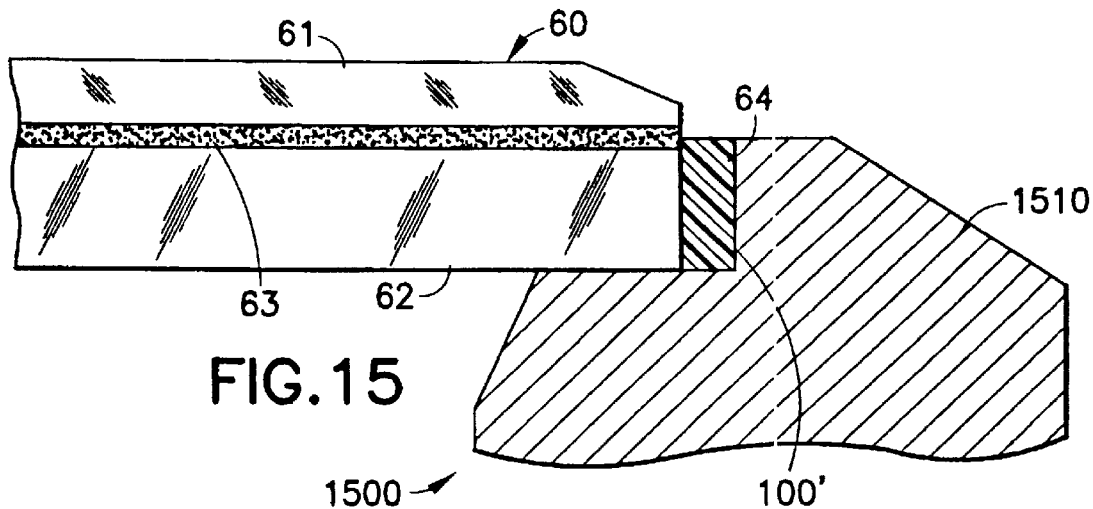
FIG. 15 is a partial sectional view showing a construction in which a laminated cover glass is fitted to a body.

As shown in FIG. 15, the laminated cover glass 60 was fitted to a support step 100' of a body 1510 through a circular plastic packing 64. In this example, since plastic packing 64 has elasticity and is press-fit to the outer periphery of a lower plate 62, the outer periphery of a lower plate 62 is subjected to compressive stress in the direction toward the central portion thereof as shown by the arrows in FIG. 16, and the central portion of the lower plate 62 tends to be deformed by buckling to project upward.

In contrast, such compressive stress does not act on upper plate 61. Therefore, stress occurs between upper plate 61 and lower plate 62, i.e., in adhesive layer 63 and the interface between adhesive layer 63 and upper plate 61 or lower plate 62. Thus, if the adhesive strength of adhesive layer 63 is weak, in-layer peeling or interfacial peeling easily occurs, particularly, in the vicinity of the outer periphery of laminated cover glass 60.

Figure 16:
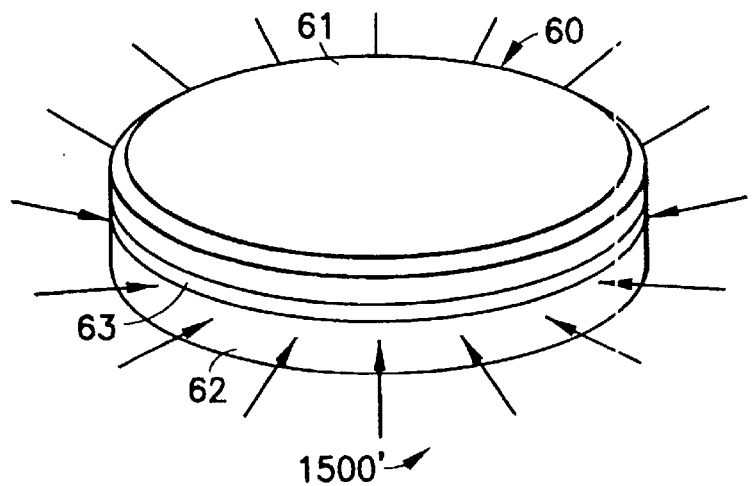
FIG. 16 is a perspective view showing compressive stress acting on a laminated cover glass.

Even if such peeling does not occur, in the state shown in FIG. 16 where compressing stress acts, for example, when the laminated cover glass 60 is placed for a long time under conditions which cause deterioration in adhesive force, such as an environment of high temperature and high humidity or an environment accompanied with rapid temperature changes, peeling can occur.

In this experiment, each of the above seven types of laminated cover glass 60 was fitted to the support step 100' of the body 1510 through the plastic packing 64, as shown in FIG. 15, and placed in the environments described below, and then whether or not peeling occurred in the adhesive layer 63 was determined with a microscope at a magnification of.

First, each of the watch cases was immersed in hot water at 60° C. for 24 hours and 100 hours, and the peeling state of the adhesive layer was determined.

Next, each watch case was placed in an environment of 40° C. and 90% RH for 24 hours, 50 hours, 100 hours and 500 hours, and then the peeling state of the adhesive layer was confirmed.

Each watch case was then subjected to a cycle 3 times, 10 times and 30 times in which the watch was held at 20° C. for 2 hours and at 60° C. for 2 hours. The peeling state of the adhesive layer was then confirmed.

The results of the experiment are shown in Table 7. In Table 7, "○" marks indicate no peeling of the adhesive layer, and "×" marks indicate the occurrence of peeling in the adhesive layer.

TABLE 7

| Confirmation Contents | | Example | | | | Conventional |
|---|---|---|---|---|---|---|
| Test Item □_ Adhesive No. | | 1 | 2 | 3 | 4 | Example |
| Immersion in hot water at 60° C. | 24 hr | ○ | ○ | ○ | ○ | X |
| | 100 hr | ○ | ○ | ○ | ○ | X |
| Under environment of 40° C. × 90% RH | 24 hr | ○ | ○ | ○ | ○ | ○ |
| | 50 hr | ○ | ○ | ○ | ○ | X |
| | 100 hr | ○ | ○ | ○ | ○ | X |
| | 500 hr | ○ | ○ | ○ | ○ | X |
| Heat cycle of −20 to +60° C. | 3 cycles | ○ | ○ | ○ | ○ | ○ |
| | 10 cycles | ○ | ○ | ○ | ○ | X |
| | 30 cycles | ○ | ○ | ○ | ○ | X |

Table 7 indicates that the examples of the present invention respectively using Adhesive Nos. 1, 2, 3 and 4 show high adhesive strength, and can maintain a good bonded state without peeling in a severe environment for a long period of time.

In contrast, the adhesive of the conventional example shows relatively low adhesive strength and durability.

Next, the same laminated cover glasses 60 as described above were formed except a circular glass plate (thickness 0.8 mm, diameter 29 mm, Vickers hardness Hv=700) comprising borosilicate glass was used as upper plate 61, and the same experiment was carried out. The results are shown in Table 8.

TABLE 8

| Confirmation Contents | | Example | | | | Conventional |
|---|---|---|---|---|---|---|
| Test Item □_ Adhesive No. | | 1 | 2 | 3 | 4 | Example |
| Immersion in hot water at 60° C. | 24 hr | ○ | ○ | ○ | ○ | X |
| | 100 hr | ○ | ○ | ○ | ○ | X |
| Under environment of 40° C. × 90% RH | 24 hr | ○ | ○ | ○ | ○ | ○ |
| | 50 hr | ○ | ○ | ○ | ○ | X |
| | 100 hr | ○ | ○ | ○ | ○ | X |
| | 500 hr | ○ | ○ | ○ | ○ | X |
| Heat cycle of −20 to +60° C. | 3 cycles | ○ | ○ | ○ | ○ | ○ |
| | 10 cycles | ○ | ○ | ○ | ○ | X |
| | 30 cycles | ○ | ○ | ○ | ○ | X |

Table 8 indicates that the examples of the present invention respectively using Adhesive Nos. 1, 2, 3 and 4 show high adhesive strength, and can maintain a good bonded state without peeling in a severe environment for a long period of time.

On the other hand, the adhesive of the conventional example shows low adhesive strength and insufficient durability.

Figure 17:
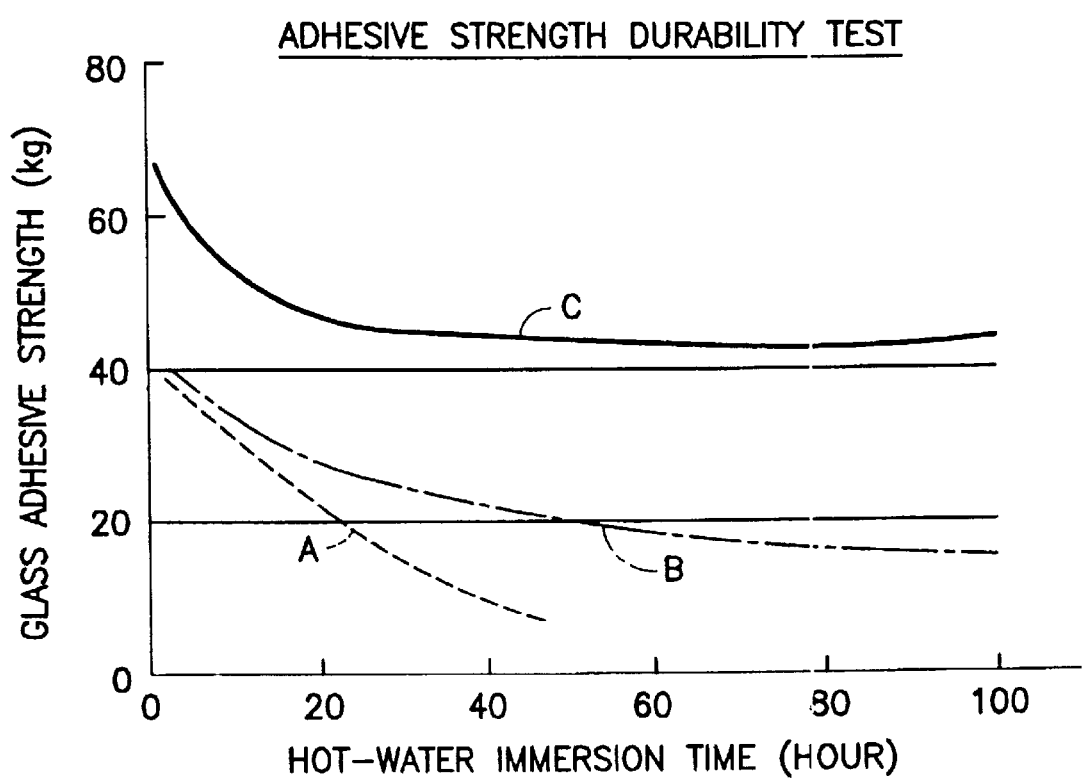
FIG. 17 is a graph showing changes in adhesive strength with time when examples of the present invention were immersed in hot water, in comparison with a conventional example.

FIG 17 is a graph showing durability of glass adhesive strength. In FIG. 17, curve C indicates the case where a cover glass was bonded to a watch case with the Trade Name TV3013B, produced by Three Bond Corporation, curve B indicates the conventional example shown in Table 3, and curve C indicates the average value when a cover glass was bonded to a watch case with each of Adhesive Nos. 1 to 4 shown in Table 1. This graph shows changes in glass adhesive strength with the passage of the immersion time when a watch case was immersed in hot water at 40° C.

In conventional example B, deterioration in the initial glass adhesive strength was suppressed, as compared with case A using an ordinary adhesive. However, in example C of this invention, it is found that the initial glass adhesive strength is high, and hardly deteriorates by immersion in hot water, and durability is thus significantly excellent. This can result from the fact that the adhesives used in this example C of this invention have high water resistance.

Figure 18:
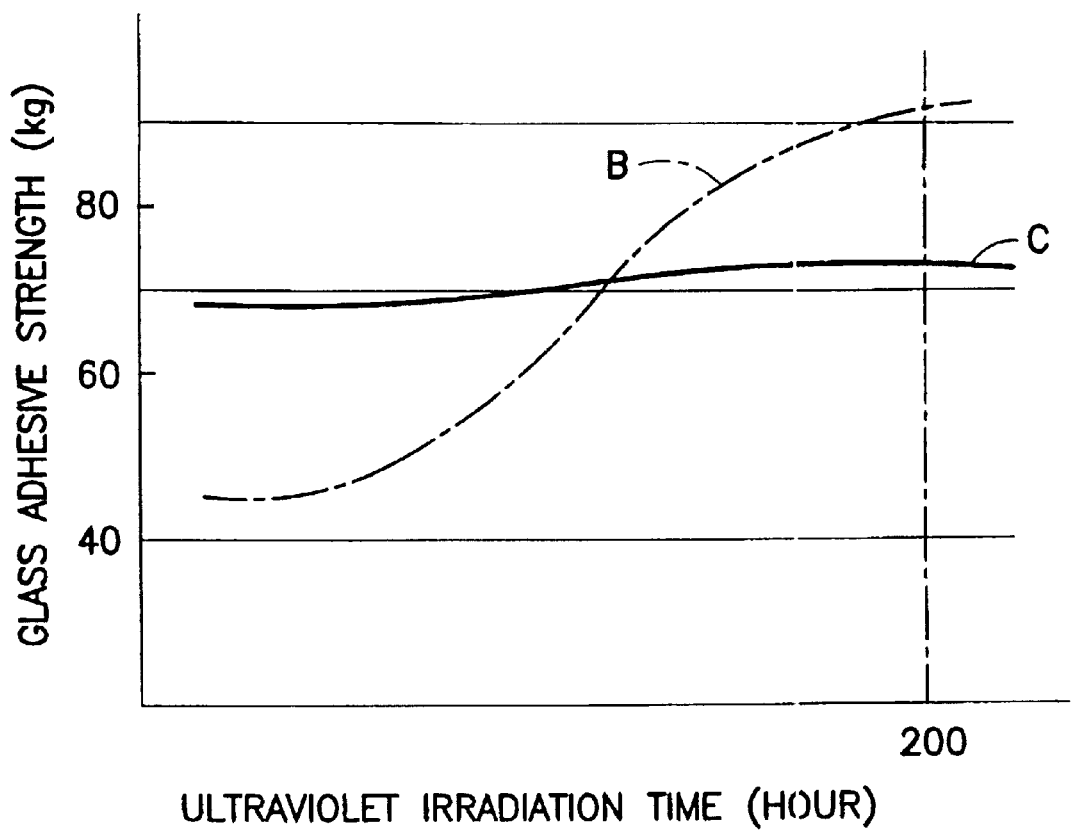
FIG. 18 is a graph showing changes in adhesive strength with time when examples of the present invention were irradiated with ultraviolet rays, in comparison with a conventional example.

FIG. 18 is a graph showing changes in glass adhesive strength with irradiation time when example C and conventional example B were further irradiated with ultraviolet rays. Although a conventional curable adhesive is substantially completely polymerized and cured in the production process, polymerization proceeds further by exposure to light, which increases hardness, thereby making the adhesive layer more brittle and deteriorating shock resistance.

In conventional example B, it was found that the hardness of the adhesive gradually increases to increase adhesive force. As a result, when the irradiation time of ultraviolet rays reached about 200 hours (shown by an arrow in FIG. 18), cracks occurred in the adhesive layer.

On the other hand, in example C, the hardness of the adhesives changes relatively little and flexibility of the adhesive layer is maintained. Therefore, in the same shock resistance test as described above, no defect, such as cracking, peeling or the like, occurred in the adhesive layer. It was thus confirmed that the present invention permits maintenance of excellent waterproofness for a long period of time without deterioration and changes in properties of the adhesives in the actual use environment.

As described above, the present invention can realize an adhesive-fixed structure having high waterproof resistance to immersion in water for a long period of time and immersion under high water pressure, relatively low changes in hardness over time and high weather resistance. Particularly, in application to a waterproof watch, it is possible to obtain a watch which has high waterproof properties under high pressure, and which exhibits neither trouble nor deterioration in shock resistance, by immersion in hot water for a long time, and which thus has high reliability.

Although, in each of the embodiments, the present invention is applied to bonding and fixing of parts of a watch, the invention is not limited to a watch and can apparently be used for various bonded parts required to have high waterproof properties. Even in bonded portions which are not necessarily required to be highly waterproof, high adhesive strength, and good durability, shock resistance and heat resistance are obtained. Therefore, the present invention can be applied to a wide range of fields.

As described above, in the present invention, an adhesive-fixed structure having a high waterproof effect and excellent durability can be realized by forming an adhesive layer having excellent water resistance and weather resistance, and causing less increase in hardness and less decrease in flexibility after bonding.

Also, an adhesive-fixed structure comprising an adhesive layer having further excellent heat resistance, adhesion, water resistance and flexibility can be realized by adjusting the contents of the components in the adhesive used, such as isobornyl (meth)acrylate, a silane coupling agent, etc., in appropriate ranges.

Further, when the present invention is applied to bonding of glass materials, particularly the same or different glass materials, it is possible to enable achievement, which cannot be made by a single glass material, for example, formation of a complicated shape or fine shape, interposition of a display layer or another intermediate layer, enhancement of the decorative effect, etc.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly, it is to be understood that in said claims, ingredients or compounds recited in the singular are intended to include compatible mixtures of such ingredients wherever the sense permits.

What is claimed is:

1. An adhesive-fixed body, comprising:
   a first member and a second member fixed together with a curable adhesive formed by combining and curing a composition comprising:
   a) 100 parts by weight of a prepolymer resin having polytetramethylene oxide as a main chain and methacryl groups or acryl groups at one or both ends of the main chain or in side chains;
   b) 50 to 300 parts by weight of at least one acrylic monomer or methacrylic monomer composition including monomers selected from the group consisting of isobornyl acrylate, isobornyl methacrylate and combinations thereof; and
   c) a silane coupling agent.

2. The adhesive-fixed body of claim 1, wherein the at least one acrylic monomer or methacrylic monomer composition includes 28 to 80% by weight of isobornyl acrylate, isobornyl methacrylate or a mixture thereof.

3. The adhesive-fixed body of claim 1, wherein the content of the silane coupling agent added to the adhesive composition is 0.5 to 20 parts by weight.

4. The adhesive-fixed body of claim 1, wherein the adhesive is formed with 1 to 20 parts by weight of polymerization initiator.

5. The adhesive-fixed body of claim 1, wherein the adhesive is a photocurable adhesive.

6. The adhesive-fixed body of claim 1, wherein the viscosity of the adhesive in an uncured state is 450 to 6500 cps at 25° C.

7. The adhesive-fixed body of claim 1, wherein the adhesive is in the form of a cured layer having an average thickness of 2 to 600 $\mu$m.

8. The adhesive-fixed body of claim 1, wherein at least one of the first member and the second member comprises a glass layer.

9. The adhesive-fixed body of claim 1, wherein the first member and the second member are both glass layers.

10. The adhesive-fixed body of claim 9, wherein the first and second members are different glass materials.

11. The adhesive-fixed body according to claim 10, wherein the first member and the second member comprise glass materials having different compositions or physical properties.

12. The adhesive-fixed body of claim 8, including a display layer between at least a portion of the first member and the second member.

13. The adhesive-fixed body of claim 1, wherein the second member has higher hardness than the first member, and a recess is formed in the first member.

14. The adhesive-fixed body of claim 1, wherein the body includes an electronic apparatus.

15. The adhesive-fixed body of claim 1, wherein the first membrane is a transparent watch cover and the second member is a different part of a watch.

16. The adhesive-fixed body of claim 8, wherein the first and second members are transparent covers of a watch.

17. The adhesive fixed body of claim 1, wherein the prepolymer resin includes polytetramethylene diacrylate or polytetramethylene urethanediacrylate.

18. The adhesive fixed body of claim 1, wherein the coupling agent is selected from the group consisting of methacryloxypropl trimethoxysilane, γ-methacryloxypropyl trimethoxylsilane, γ-glycidoxypropyl trimethoxysialne, γ-vinyltrimethoxysilane, N-βvinylbenzulaminoethyl-γ-aminopropyltrimethoxysilane hydrochloride.

19. The adhesive fixed body of claim 1, wherein the adhesive composition includes a UV curing agent.

20. An electronic apparatus, comprising:
   a first member and a second member fixed together with a curable adhesive formed by combining and curing a composition comprising:

a) 100 parts by weight of a prepolymer resin having polytetramethylene oxide as a main chain and methacryl groups or acryl groups at one or both ends of the main chain or in side chains;

b) 50 to 300 parts by weight of at least one acrylic monomer or methacrylic monomer composition including monomers selected from the group consisting of isobornyl acrylate, isobornyl methacrylate and combinations thereof; and c) a silane coupling agent.

21. The electronic apparatus of claim 20, wherein the at least one acrylic monomer or methacrylic monomer composition includes 28 to 80% by weight of isobornyl acrylate, isobornyl methacrylate or a mixture thereof.

22. The electronic apparatus of claim 20, wherein the content of the silane coupling agent added to the adhesive composition is 0.5 to 20 parts by weight.

23. The electronic apparatus of claim 20, wherein the adhesive is formed with 1 to 20 parts by weight of polymerization initiator.

24. The electronic apparatus of claim 20, wherein the adhesive is a photocurable adhesive.

25. The electronic apparatus of claim 20, wherein the viscosity of the adhesive in an uncured state is 450 to 6500 cps at 25° C.

26. The electronic apparatus of claim 20, wherein the adhesive is in the form of a cured layer having an average thickness of 2 to 600 $\mu$m.

27. The electronic apparatus of claim 20, wherein at least one of the first member and the second member comprises a glass layer.

28. The electronic apparatus of claim 20, wherein the first member and the second member are both glass layers.

29. The electronic apparatus of claim 28, wherein the first and second members are different glass materials.

30. The electronic apparatus according to claim 29, wherein the first member and the second member comprise glass materials having different compositions or physical properties.

31. The electronic apparatus of claim 27, including a display layer between at least a portion of the first member and the second member.

32. The electronic apparatus of claim 20, wherein the second member has higher hardness than the first member, and a recess is formed in the first member.

33. The electronic apparatus of claim 20, wherein the body includes an electronic apparatus.

34. The electronic apparatus of claim 20, wherein the first membrane is a transparent watch cover and the second member is a different part of a watch.

35. The electronic apparatus of claim 27, wherein the first and second members are transparent covers of a watch.

36. The electronic apparatus of claim 20, wherein the prepolymer resin includes polytetramethylene diacrylate or polytetramethylene urethanediacrylate.

37. The electronic apparatus of claim 20, wherein the coupling agent is selected from the group consisting of methacryloxypropl trimethoxysilane, γ-methacryloxypropyl trimethoxylsilane, γ-glycidoxypropyl trimethoxysialne, γ-vinyltrimethoxysilane, N-βvinylbenzulaminoethyl-γ-aminopropyltrimethoxysilane hydrochloride.

38. The electronic apparatus of claim 20, wherein the adhesive composition includes a UV curing agent.

39. A watch, comprising:
a first member and a second member fixed together with a curable adhesive formed by combining and curing a composition comprising:
a) 100 parts by weight of a prepolymer resin having polytetramethylene oxide as a main chain and methacryl groups or acryl groups at one or both ends of the main chain or in side chains;

b) 50 to 300 parts by weight of at least one acrylic monomer or methacrylic monomer composition including monomers selected from the group consisting of isobornyl acrylate, isobornyl methacrylate and combinations thereof; and c) a silane coupling agent.

40. The watch of claim 39, wherein the at least one acrylic monomer or methacrylic monomer composition includes 28 to 80% by weight of isobornyl acrylate, isobornyl methacrylate or a mixture thereof.

41. The watch of claim 39, wherein the content of the silane coupling agent added to the adhesive composition is 0.5 to 20 parts by weight.

42. The watch of claim 39, wherein the adhesive is formed with 1 to 20 parts by weight of polymerization initiator.

43. The watch of claim 39, wherein the adhesive is a photocurable adhesive.

44. The watch of claim 39, wherein the viscosity of the adhesive in an uncured state is 450 to 6500 cps at 25° C.

45. The watch of claim 39, wherein the adhesive is in the form of a cured layer having an average thickness of 2 to 600 $\mu$m.

46. The watch of claim 39, wherein at least one of the first member and the second member comprises a glass layer.

47. The watch of claim 39, wherein the first member and the second member are both glass layers.

48. The watch of claim 47, wherein the first and second members are different glass materials.

49. The watch according to claim 48, wherein the first member and the second member comprise glass materials having different compositions or physical properties.

50. The watch of claim 46, including a display layer between at least a portion of the first member and the second member.

51. The watch of claim 39, wherein the second member has higher hardness than the first member, and a recess is formed in the first member.

52. The watch of claim 39, wherein the body includes an electronic apparatus.

53. The watch of claim 39, wherein the first membrane is a transparent watch cover and the second member is a different part of a watch.

54. The watch of claim 46, wherein the first and second members are transparent covers of a watch.

55. The watch of claim 39, wherein the prepolymer resin includes polytetramethylene diacrylate or polytetramethylene urethanediacrylate.

56. The watch of claim 39, wherein the coupling agent is selected from the group consisting of methacryloxypropl trimethoxysilane, γ-methacryloxypropyl trimethoxylsilane, γ-glycidoxypropyl trimethoxysialne, γ-vinyltrimethoxysilane, N-βvinylbenzulaminoethyl-γ-aminopropyltrimethoxysilane hydrochloride.

57. The watch of claim 39, wherein the adhesive composition includes a UV curing agent.

58. An adhesive formed by combining components, comprising:
a) 100 parts by weight of a prepolymer resin having polytetramethylene oxide as a main chain and methacryl groups or acryl groups at one or both ends of the main chain or in side chains;

b) 50 to 300 parts by weight of at least one acrylic monomer or methacrylic monomer composition including monomers selected from the group consisting of isobornyl acrylate, isobornyl methacrylate and combinations thereof; and c) a silane coupling agent.

* * * * *